(12) United States Patent
Atmur et al.

(10) Patent No.: US 10,024,391 B2
(45) Date of Patent: Jul. 17, 2018

(54) ELLIPTICALLY INTERFACING GEARBOX

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 14/989,760

(22) Filed: Jan. 6, 2016

(65) Prior Publication Data
US 2017/0191549 A1   Jul. 6, 2017

(51) Int. Cl.
 *F16H 1/32* (2006.01)
 *F16H 55/08* (2006.01)

(52) U.S. Cl.
 CPC ............. *F16H 1/321* (2013.01); *F16H 55/08* (2013.01)

(58) Field of Classification Search
 CPC ..................................................... F16H 1/321
 See application file for complete search history.

(56) References Cited

U.S. PATENT DOCUMENTS

| 37,165 A | 12/1862 | Gary |
| 1,611,981 A | 12/1926 | Amberg |
| 2,275,827 A | 3/1942 | Plensler |

(Continued)

FOREIGN PATENT DOCUMENTS

| CH | 233459 A | 7/1944 |
| CN | 2276093 Y | 3/1998 |

(Continued)

OTHER PUBLICATIONS

Antonio S de Castro; Exploring a rehnomic system; Dec. 23, 1999, retrieved from the internet at https://arxiv.org/pdf/physics/9912049.pdf,6 pages.

(Continued)

*Primary Examiner* — Ramya P Burgess
*Assistant Examiner* — Timothy Hannon
(74) *Attorney, Agent, or Firm* — Kolisch Hartwell, P.C.

(57) ABSTRACT

An elliptically interfacing gearbox system may include an input plate having a rotation axis and a plurality of input teeth. The gearbox system may include a wobble plate having a wobble axis disposed at a non-zero angle relative to the rotation axis, a rear face, and a plurality of face teeth disposed on the rear face. The wobble plate may further include a first plurality of wobble teeth disposed in a first plane perpendicular to the wobble axis and a second plurality of wobble teeth disposed in a second plane perpendicular to the wobble axis. The second plane may be spaced from the first plane along the wobble axis. The gearbox system may include a stator gear having a plurality of stator teeth and an output plate having an output axis substantially aligned with the rotation axis and a plurality of output teeth. The plurality of input teeth may be configured to engage with the plurality of face teeth, the first plurality of wobble teeth may be configured to engage with the plurality of stator teeth, and the second plurality of wobble teeth may be configured to engage with the plurality of output teeth as the wobble plate nutates around the stator gear.

20 Claims, 32 Drawing Sheets

(56) References Cited

U.S. PATENT DOCUMENTS

| | | | |
|---|---|---|---|
| 2,458,983 | A | 1/1949 | Dunn |
| 2,509,391 | A | 5/1950 | Hansen et al. |
| 2,699,690 | A | 1/1955 | Kobler |
| 2,703,370 | A | 3/1955 | Steensen |
| 2,857,536 | A | 10/1958 | Light |
| 2,866,110 | A | 12/1958 | Schon |
| 2,871,382 | A | 1/1959 | Bouvier |
| 2,908,191 | A * | 10/1959 | Sundt ............... F16H 1/321 475/176 |
| 3,117,244 | A | 1/1964 | Rosain et al. |
| 3,234,393 | A | 2/1966 | Ruschmann |
| 3,249,776 | A | 5/1966 | Anderson et al. |
| 3,322,984 | A | 5/1967 | Anderson |
| 3,341,726 | A | 9/1967 | Brinster et al. |
| 3,428,839 | A | 2/1969 | Singleton et al. |
| 3,463,953 | A | 8/1969 | Maxwell |
| 3,474,272 | A | 10/1969 | Newell |
| 3,525,890 | A | 8/1970 | Buchanan, Jr. |
| 3,539,847 | A | 11/1970 | Gifford |
| 3,579,276 | A | 5/1971 | Newell |
| 3,640,154 | A | 2/1972 | Massie |
| RE29,411 | E | 9/1977 | Newell |
| 4,081,702 | A | 3/1978 | Neumann |
| 4,108,017 | A * | 8/1978 | Rouverol ............ F16H 55/08 74/462 |
| 4,330,725 | A | 5/1982 | Hintz |
| 4,495,432 | A | 1/1985 | Katsuma et al. |
| 4,906,881 | A | 3/1990 | Knight |
| 5,111,102 | A | 5/1992 | Meeks |
| 5,747,915 | A | 5/1998 | Benavides |
| 5,804,898 | A | 9/1998 | Kawai |
| 5,820,504 | A | 10/1998 | Geralde |
| 5,906,142 | A | 5/1999 | Shirasawa |
| 6,568,929 | B2 | 5/2003 | Takagi |
| 6,664,711 | B2 | 12/2003 | Baudendistel |
| 7,165,473 | B2 | 1/2007 | Kobayashi et al. |
| 7,540,865 | B2 | 6/2009 | Griffin et al. |
| 7,824,345 | B2 | 11/2010 | Euteneuer et al. |
| 7,841,994 | B2 | 11/2010 | Skujins et al. |
| 7,850,623 | B2 | 12/2010 | Griffin et al. |
| 7,878,984 | B2 | 2/2011 | Jacobsen et al. |
| 7,914,466 | B2 | 3/2011 | Davis et al. |
| 7,914,467 | B2 | 3/2011 | Layman et al. |
| 7,969,055 | B2 | 6/2011 | Titus |
| 8,022,331 | B2 | 9/2011 | Reynolds et al. |
| 8,048,004 | B2 | 11/2011 | Davis et al. |
| 8,048,060 | B2 | 11/2011 | Griffin et al. |
| 8,105,246 | B2 | 1/2012 | Voeller et al. |
| 8,137,293 | B2 | 3/2012 | Zhou et al. |
| 8,169,118 | B2 | 5/2012 | Filatov |
| 8,182,465 | B2 | 5/2012 | Griffin et al. |
| 8,231,551 | B2 | 7/2012 | Griffin et al. |
| 8,257,279 | B2 | 9/2012 | Davis et al. |
| 8,368,269 | B2 | 2/2013 | Titus |
| 8,376,961 | B2 | 2/2013 | Layman et al. |
| 8,377,035 | B2 | 2/2013 | Zhou et al. |
| 8,409,114 | B2 | 4/2013 | Parins |
| 8,449,526 | B2 | 5/2013 | Snyder et al. |
| 8,535,243 | B2 | 9/2013 | Shireman |
| 8,551,020 | B2 | 10/2013 | Chen et al. |
| 8,551,021 | B2 | 10/2013 | Voeller et al. |
| 8,556,914 | B2 | 10/2013 | Vrba |
| 8,636,716 | B2 | 1/2014 | Griffin et al. |
| 8,646,360 | B2 | 2/2014 | Kanai |
| 9,124,150 | B2 | 9/2015 | Atmur |
| 9,164,497 | B2 | 10/2015 | Cameron et al. |
| 2009/0064812 | A1 * | 3/2009 | Gutmann ............ F16H 55/08 74/462 |
| 2010/0224435 | A1 | 9/2010 | Yamamori |
| 2014/0285072 | A1 | 9/2014 | Atmur et al. |
| 2015/0015174 | A1 | 1/2015 | Atmur |

FOREIGN PATENT DOCUMENTS

| | | |
|---|---|---|
| CN | 104065202 A | 9/2014 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 3565746 A1 | 10/1993 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |
| GB | 2211900 A | 7/1989 |
| GB | 2327998 A | 2/1999 |
| JP | 30017749 A | 1/1985 |
| JP | 2014187867 A | 10/2014 |
| JP | 2015039286 A | 2/2015 |
| WO | 2008149696 A1 | 12/2008 |
| WO | 2011154981 A1 | 12/2011 |
| WO | 203098755 U | 7/2013 |
| WO | 2014051131 A1 | 4/2014 |
| WO | 2014118284 A2 | 8/2014 |

OTHER PUBLICATIONS

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., an electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Francesco Fasso et al., Conservation of energy and momenta in nonholonomic systems with affine constraints, May 5, 2015, 16 pages.

European Patent Office, Extended European Search Report in European Patent Application No. 16156922.3-1806, dated Sep. 30, 2016, 6 pages.

European Patent Office, Extended European Search Report in European Patent Application No. 16196546.2-1762, dated May 3, 2017, 9 pages.

European Patent Office, Extended European Search Report in European Patent Application No. 16194812.0-1762, dated Jun. 7, 2017, 8 pages.

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Busman, Zeke, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

Lipton, Tom, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

(56) References Cited

OTHER PUBLICATIONS

European Patent Office, Extended European Search Report in European Patent Application No. 17167409.6-1809, dated Sep. 22, 2017, 9 pages.
U.S. Patent and Trademark Office, Non-Final Office Action in U.S. Appl. No. 14/932,901, dated Feb. 23, 2018, 48 pages.

* cited by examiner

ELLIPTICALLY INTERFACING GEARBOX

FIELD

This disclosure relates generally to gearboxes. More particularly, embodiments of the present disclosure relate to an elliptically interfacing gearbox including a wobble plate.

BACKGROUND

Gearboxes can be used to increase torque while reducing the rotational speed of a shaft. For example, an output shaft may rotate at a slower speed than an input shaft. This speed reduction is can be effected by interfacing two or more gears with different numbers of gear teeth and may provide a mechanical advantage.

There are many ways to arrange gears so that a single rotation of a first gear will result in more or less than one rotation of a second gear in the same amount of time. The gear ratio is the ratio of these two rotations. In the case where the second gear rotates less than the first gear the gear combination could be said to provide a gear reduction. In certain applications it is desirable to have a gearbox with a relatively high gear ratio, where the gear reduction takes place in the smallest possible volume. For example, a drive mechanism that converts many rotations of an input shaft into a single rotation of an output shaft.

Historically, wobble plate drive mechanisms have seemed a promising route toward a device having a high gear ratio within a small volume. Examples of such wobble plate drive mechanisms are disclosed in U.S. Patent Publication Nos. US20140285072 and US20150015174. Older systems are disclosed in U.S. Pat. No. 2,275,827 and U.S. Pat. No. 3,249,776. The disclosures of these and all other publications referenced herein are incorporated by reference in their entirety for all purposes.

In a wobble plate mechanism, one of the gears, a wobble plate, nutates around another gear, for example a stator gear. If the number of gear teeth on the wobble plate and the stator gear are different by one, then such a system would have a gear ratio equal to the number of teeth on the stator gear.

In principle, the gear ratios in wobble plate drive mechanisms could be quite high. A theoretical wobble plate drive mechanism only using two gears may achieve a relatively high gear ratio, in a small volume. However, in practice, efficient and effective wobble plate drive systems have proved elusive, because the forces involved often lead to one or more of disengagement of the mechanism, unacceptable levels of vibration, or inefficiency due to friction.

SUMMARY

An elliptically interfacing gearbox system may include an input plate having a rotation axis and a plurality of input teeth. The gearbox system may include a wobble plate having a wobble axis disposed at a non-zero angle relative to the rotation axis, a rear face, and a plurality of face teeth disposed on the rear face. The wobble plate may further include a first plurality of wobble teeth disposed in a first plane perpendicular to the wobble axis and a second plurality of wobble teeth disposed in a second plane perpendicular to the wobble axis. The second plane may be spaced from the first plane along the wobble axis. The gearbox system may include a stator gear having a plurality of stator teeth and an output plate having an output axis substantially aligned with the rotation axis and a plurality of output teeth. The plurality of input teeth may be configured to engage with the plurality of face teeth, the first plurality of wobble teeth may be configured to engage with the plurality of stator teeth, and the second plurality of wobble teeth may be configured to engage with the plurality of output teeth as the wobble plate nutates around the stator gear.

A wobble plate for use in an elliptically interfacing gearbox system may include a wobble axis, a first plurality of wobble teeth, a second plurality of wobble teeth, and a plurality of face teeth. The first plurality of wobble teeth may be disposed in a first plane perpendicular to the wobble axis. The second plurality of wobble teeth may be disposed in a second plane perpendicular to the wobble axis, and the second plane may be spaced along the wobble axis from the first plane. The plurality of face teeth may be disposed in a third plane perpendicular to the wobble axis, and the third plane may be spaced along the wobble axis from the first plane and the second plane. At least one of the first plurality of wobble teeth and the second plurality of wobble teeth may have a cross-sectional shape at least partially defined by a compound involute of a circle and an ellipse.

A method for operating an elliptically interfacing gearbox mechanism may include rotating an input plate including a plurality of input teeth. The method may include engaging the plurality of input teeth with a plurality of face teeth of a wobble plate, thereby causing the wobble plate to nutate about a fulcrum. The method may further include engaging a first plurality of wobble teeth of the wobble plate with a plurality of stator teeth of a stator gear as the wobble plate nutates. The method may include engaging a second plurality of wobble teeth of the wobble plate with a plurality of output teeth of an output plate as the wobble plate nutates.

The present disclosure provides various apparatuses and methods of use thereof. In some embodiments, a device may include an input plate, a wobble plate, a stator gear, and an output plate. In some embodiments, the wobble plate may nutate around the stator, the input plate, and the output plate as the input plate rotates. In some embodiments, the output plate may rotate as the wobble plate nutates. In some embodiments, each of the wobble plate, the stator gear, and the output plate may include a set of teeth having shapes designed to limit eccentric forces. In some embodiments, the teeth of the wobble plate, the teeth of the stator gear, and the teeth of the output plate may be designed to engage via a rolling contact that may limit losses due to friction. Features, functions, and advantages may be achieved independently in various embodiments of the present disclosure, or may be combined in yet other embodiments, further details of which can be seen with reference to the following description and drawings.

DESCRIPTION

Overview

Various embodiments of apparatuses and methods related to a gearbox having a wobble plate are described below and illustrated in the associated drawings. Unless otherwise specified, an apparatus or methods and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses or methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Examples, Components, and Alternatives

The following sections describe selected aspects of exemplary gearbox systems as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
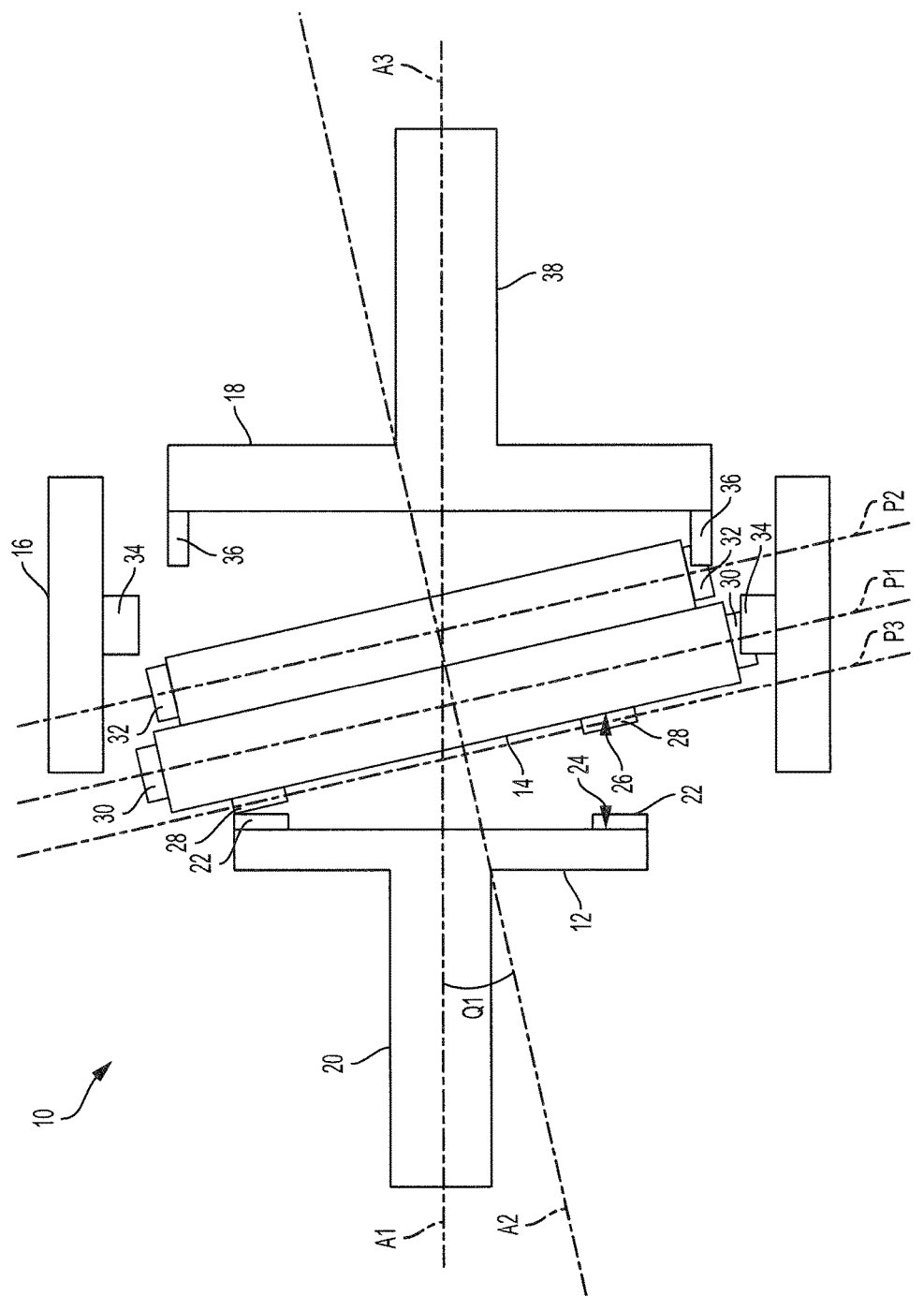
FIG. 1 is a schematic representation of a cross-sectional view of an embodiment of a gearbox system.

This example describes an illustrative gearbox system, see FIG. 1.

FIG. 1 is a schematic cross-sectional view of a gearbox system or gearbox, generally indicated at 10. Gearbox system 10 may include an input plate 12, a wobble plate 14, a stator gear 16 and an output plate 18.

Input plate 12 may be coupled to an input shaft 20 and may be configured to rotate around a rotation axis A1. Input plate 12 may rotate around the rotation axis A1 in response to a torque applied to the input plate, for example, by the input shaft 20. The input plate may have a plurality of input teeth 22 disposed on an annular input surface 24 of the input plate.

Wobble plate 14 may have a wobble axis A2 disposed at a non-zero angle Q1 relative to the rotation axis A1. Angle Q1 may be exaggerated in FIG. 1. Wobble plate 14 may have a rear face 26 and a plurality of face teeth 28 disposed on the rear face. Wobble plate 14 may include a first plurality of wobble teeth 30 disposed in a first plane P1 which may be perpendicular to the wobble axis A2 and a second plurality of wobble teeth 32 disposed in a second plane P2 which may be perpendicular to the wobble axis A2. The second plane P2 may be spaced along the wobble axis from the first plane P1. The plurality of face teeth 28 may be said to be disposed in a third plane P3 perpendicular to the wobble axis A2. The third plane may be spaced along the wobble axis from the first plane P1 and the second plane P2.

The wobble plate 14 may be configured to engage with the input plate 12 and rotate in response to a rotation of the input plate. The engagement of the wobble plate and the input plate may include engagement between the plurality of face teeth 28 and the plurality of input teeth 22. The rotation of the wobble plate may be according to a first gear ratio between the input plate and the wobble plate.

The first gear ratio may depend upon a count of the plurality of input teeth 22 and a count of the plurality of face teeth 28 of the wobble plate. In some embodiments, the first gear ratio may be 1:1. That is, the wobble plate may rotate once for every single rotation of the input plate. Other values for the first gear ratio are also possible, including embodiments where the wobble plate rotates faster or slower than the input plate.

Stator 16 may be stationary within the context of a device of which gearbox 10 is a component. Stator 16 may include a plurality of stator teeth 34. The wobble plate 14 may be configured to engage with the stator and nutate in response to the rotation of the wobble plate. That is, in response to a rotation of the input plate, the wobble plate may simultaneously rotate and nutate about the stator. As the wobble plate 14 nutates, the wobble axis A2 may precess around the rotation axis A1 while maintaining the angular separation Q1 between the wobble and rotation axes. The engagement of the wobble plate and the stator may include engagement between the first plurality of wobble teeth 30 and the plurality of stator teeth 34.

The nutation of the wobble plate 14 may be according to a second gear ratio between the wobble plate and the stator 16. That is, the wobble plate may complete a number of nutations for every single rotation of the wobble plate. The second gear ratio may be the ratio of a count the number of nutations completed by the wobble plate and a count of the corresponding number of rotations of the wobble plate. The second gear ratio may depend upon a count of the first plurality of wobble teeth 30 and a count of the plurality of stator teeth 34. For example, there may be ninety-one stator teeth interacting with ninety wobble teeth. In this case, the wobble plate may complete ninety-one nutations for every single complete rotation of the wobble plate, a second gear ratio of 91:1.

Output plate 18 may have an output axis A3 which may be substantially aligned with rotation axis A1. Output plate 18 may have a plurality of output teeth 36. The output plate may be configured to engage with the wobble plate 14 and may rotate around the output axis A3 in response to the nutation of the wobble plate. The engagement of the output plate with the wobble plate may include engagement between the plurality of output teeth 36 and the second plurality of wobble teeth 32. The rotation of the output plate relative to the wobble plate may be according to a third gear ratio between the wobble plate and the output plate.

The third gear ratio may be the ratio of a count the number of nutations completed by the wobble plate and a count of the corresponding number of rotations of the output plate relative to the wobble plate. The third gear ratio may depend upon a count of the second plurality of wobble teeth 32 and a count of the plurality of output teeth 36. For example, there may be eighty-six output teeth interacting with eighty-five wobble teeth. In this case, the wobble plate may complete eighty-six nutations for every single rotation of the output plate relative to the wobble plate, a third gear ratio of 86:1.

Gearbox system 10 may have a total gear ratio that depends upon the first gear ratio, the second gear ratio, and the third gear ratio. The total gear ratio may be a ratio between a number of rotations of the input plate and a corresponding number of rotations of the output plate. The total gear ratio may depend upon counts of the plurality of input teeth, the plurality of face teeth, the first plurality of wobble teeth, the second plurality of wobble teeth, the plurality of stator teeth, and the plurality of output teeth. In the case where there are equal numbers of input teeth and face teeth, there is one more stator teeth than first wobble teeth, and there is one more output tooth than second wobble teeth, the total gear ratio of the gearbox system may be the product of the counts of stator teeth and output teeth, divided by the difference between the counts of stator teeth and output teeth. The total gear ratio may be greater than 100:1, greater than 1000:1, or greater than 10,000:1.

Gearbox system 10 may be configured so that each tooth of the first plurality of wobble teeth engages with a tooth of the plurality of stator teeth via rolling contact as the wobble plate nutates around the stator gear. Each tooth of the second plurality of wobble teeth may be configured to engage a tooth of the plurality of output teeth via rolling contact as the wobble plate nutates around the stator gear. This may be in contrast to most gear systems where teeth from different gears interact via a sliding contact. Engagement via rolling contact may reduce frictional forces within the gearbox as compared to sliding contact, as a coefficient of rolling friction is generally smaller than a coefficient of sliding friction for a pair of objects or materials.

Engagement via rolling contact may increase the efficiency of the gearbox system 10. Efficiency for the gearbox system may be a measure of what percentage of rotational energy of the input plate transforms into rotational energy of the output plate. Energy may be lost within the gearbox system to heat due to frictional forces. The gearbox system 10 may operate at an efficiency greater than eighty percent.

Output plate 18 may be coupled to an output shaft 38. Output shaft 38 may rotate around output axis A3 along with output plate 18.

Example 2

Figure 2:
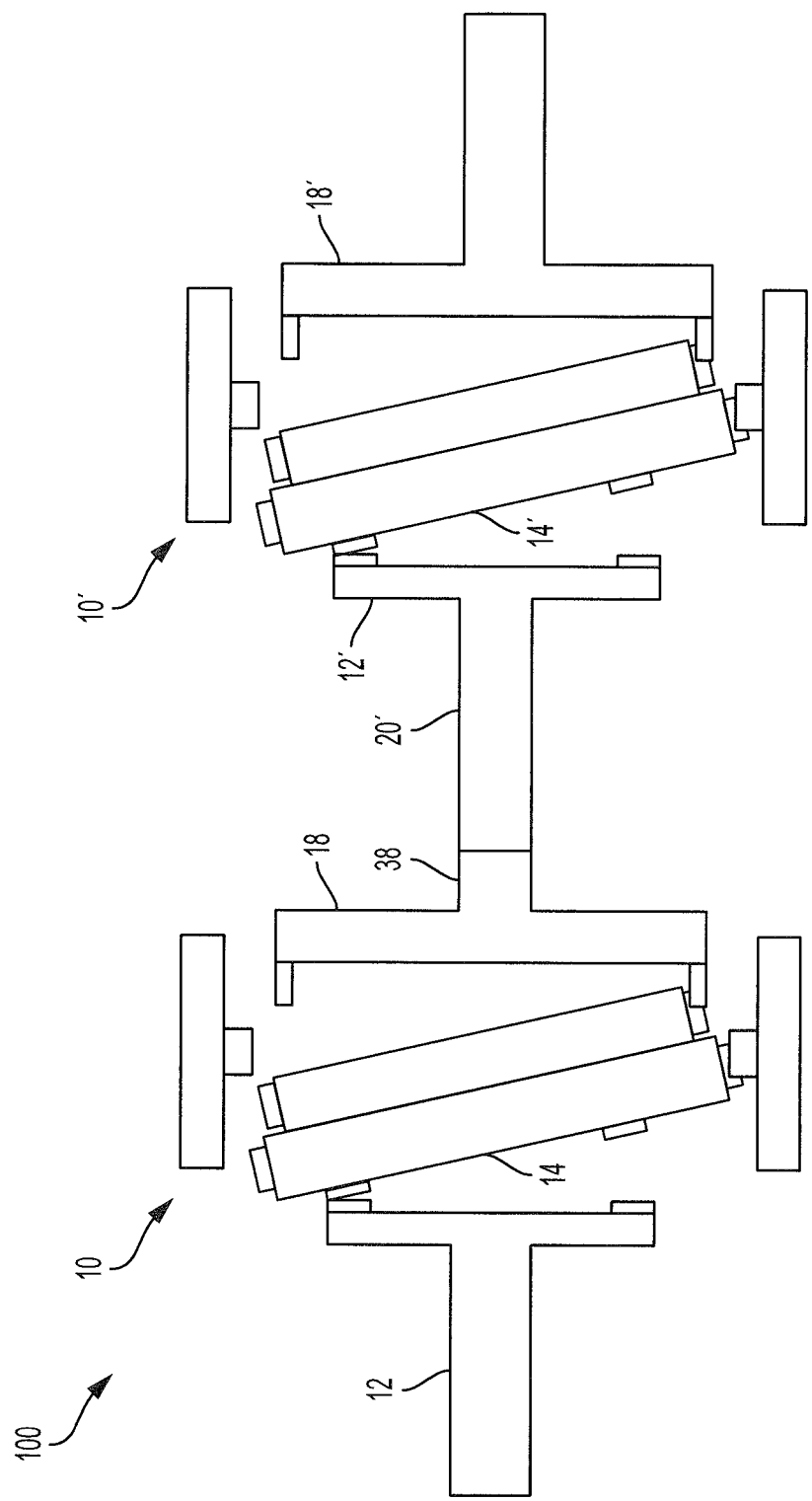
FIG. 2 is a schematic representation of a cross-sectional view of another embodiment of a gearbox system.

This example describes an illustrative gearbox system, see FIG. 2.

FIG. 2 is a schematic cross-sectional view of a gearbox system, generally indicated at 100. Gearbox system 100 may include a first copy of the gearbox system of Example 1, indicated at 10 and a second copy of the gearbox system of Example 1, indicated at 10'. Primed reference numbers will be used in reference to components of the second gearbox system 10' and unprimed reference numbers will be used in reference to components of the first gearbox system 10. Gearbox 10 and gearbox 10' may be connected in series.

Gearbox system 100 may have the output plate 18 of gearbox 10 coupled to the input plate 12' of gearbox 10'. Output plate 18 may be coupled to input plate 12' by coupling output shaft 38 to input shaft 20', so that the output plate 18, the output shaft 38, the input shaft 20', and the input plate 12' function as a single rigid unit. A gear ratio for gearbox system 100 may be the square of the total gear ratio of gearbox 10. For example, if the total gear ratio of gearbox 10 is 1000:1 and the total gearbox ratio of gearbox 10' is also 1000:1, then the gear ratio of gearbox system 100 may be 1,000,000:1. Gearbox system may only have five moving parts: input plate 12, wobble plate 14, output plate 18 together with input plate 12', wobble plate 14', and output plate 18'.

Example 3

Figure 3:
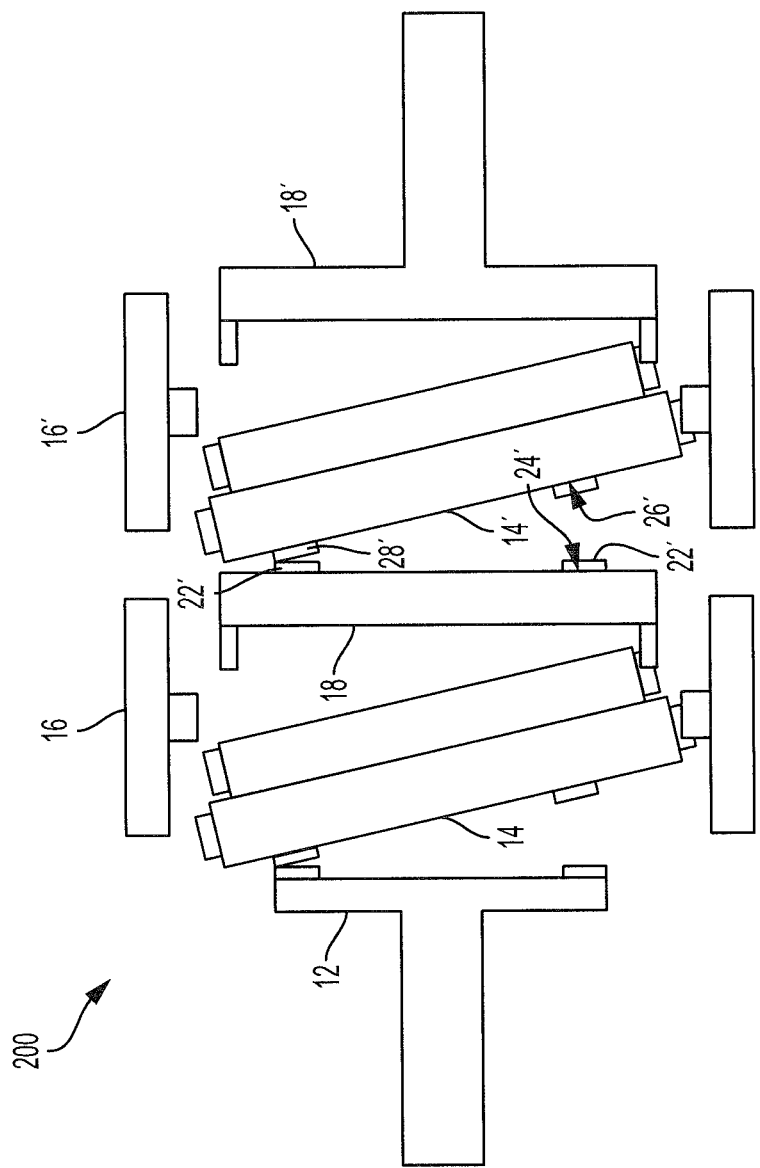
FIG. 3 is a schematic representation of a cross-sectional view of another embodiment of a gearbox system.

This example describes an illustrative gearbox system, see FIG. 3.

FIG. 3 is a schematic cross-sectional view of a gearbox system, generally indicated at 200. Gearbox system 200 may be similar in spirit to gearbox system 100 described in Example 2. However, instead of connecting output plate 18 to input plate 12' through output shaft 38 and input shaft 20' as in Example 2, gearbox system 200 may dispense with the output shaft, the second input shaft, and even the input plate and have a wobble plate 14' engage directly with output plate 18.

Gearbox system 200 may have an input plate 12 that engages with a wobble plate 14 and drives a rotation of the wobble plate 14. Wobble plate 14 may engage with a stator 16 and nutate around stator 16 as it rotates. Wobble plate 14 may engage with output plate 18 and drive a rotation of output plate 18 as the wobble plate 14 nutates around the stator 16. Output plate 18 may engage with wobble plate 14' and drive a rotation of wobble plate 14. The output plate 18 may engage with wobble plate 14' through a second plurality of input teeth 22' disposed on an annular input surface 24' of the output plate 18 and a plurality of face teeth 28' disposed on a rear face 26' of wobble plate 14'. Wobble plate 14' may engage with a stator 16' and nutate around stator 16' as it rotates. Wobble plate 14' may engage with output plate 18' and drive a rotation of output plate 18' as the wobble plate 14' nutates around the stator 16'.

A gear ratio for gearbox system 200 may be similar to the gear ratio for gearbox system 100. Similarly, gearbox system 200 may have a gear ratio of 1,000,000:1 or higher with only five moving parts: input plate 12, wobble plate 14, output plate 18, wobble plate 14', and output plate 18'.

Example 4

This example describes an illustrative gearbox system, see FIGS. 4-31.

Figure 4:
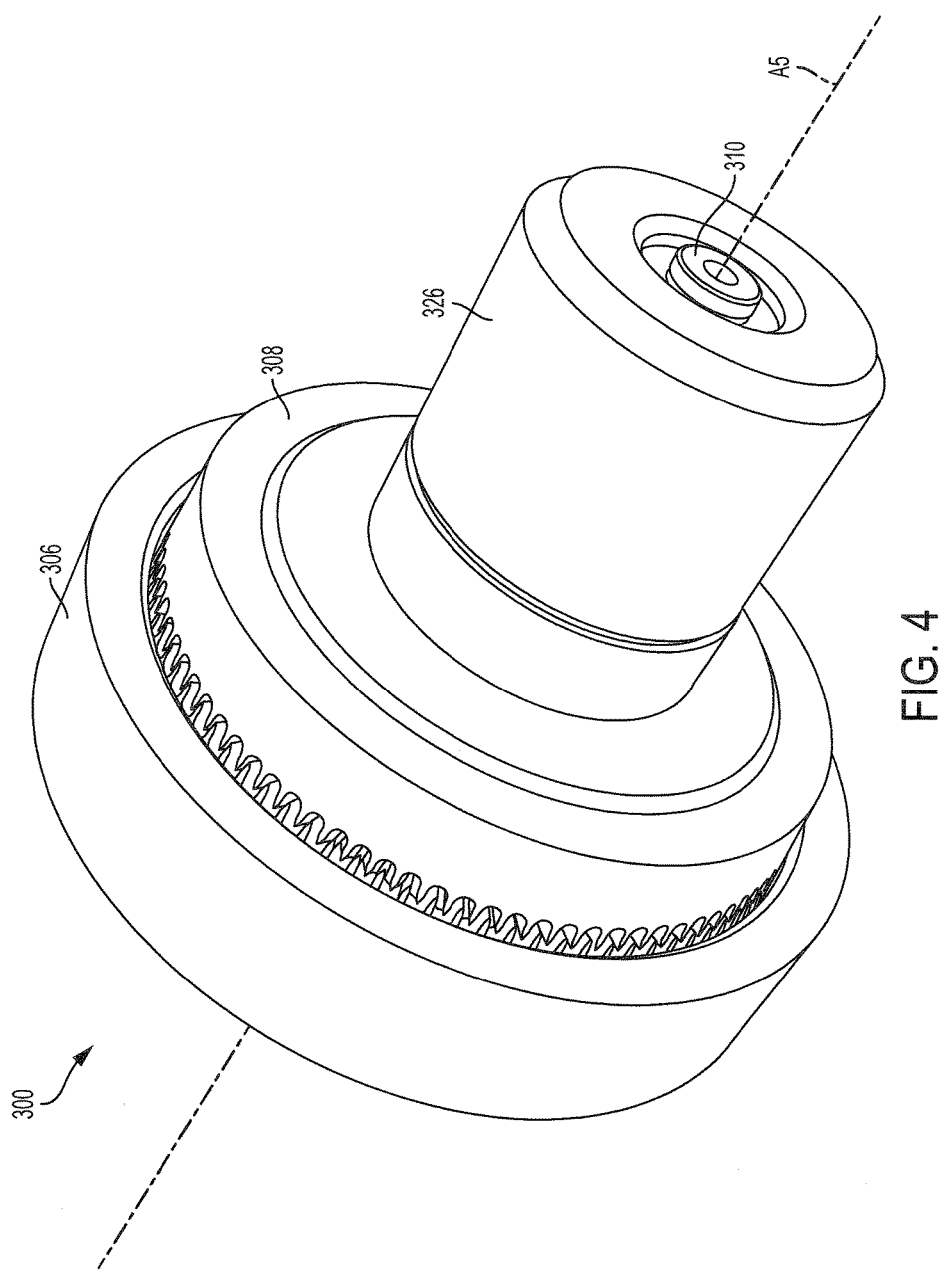
FIG. 4 is a diagrammatic representation of an isometric view of another embodiment of a gearbox system.
Figure 5:
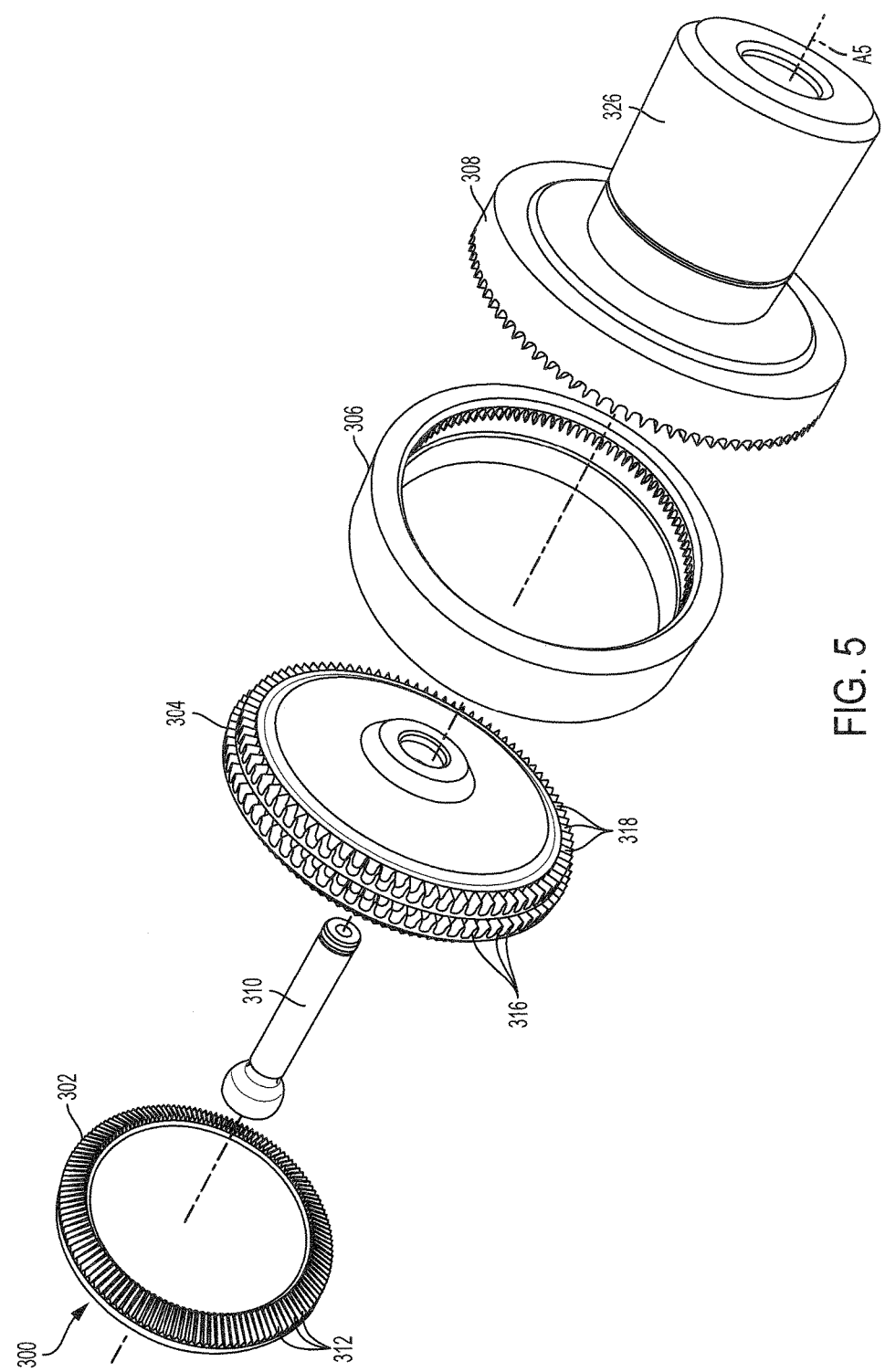
FIG. 5 is a diagrammatic representation of an isometric exploded front view of the gearbox system of FIG. 4.
Figure 6:
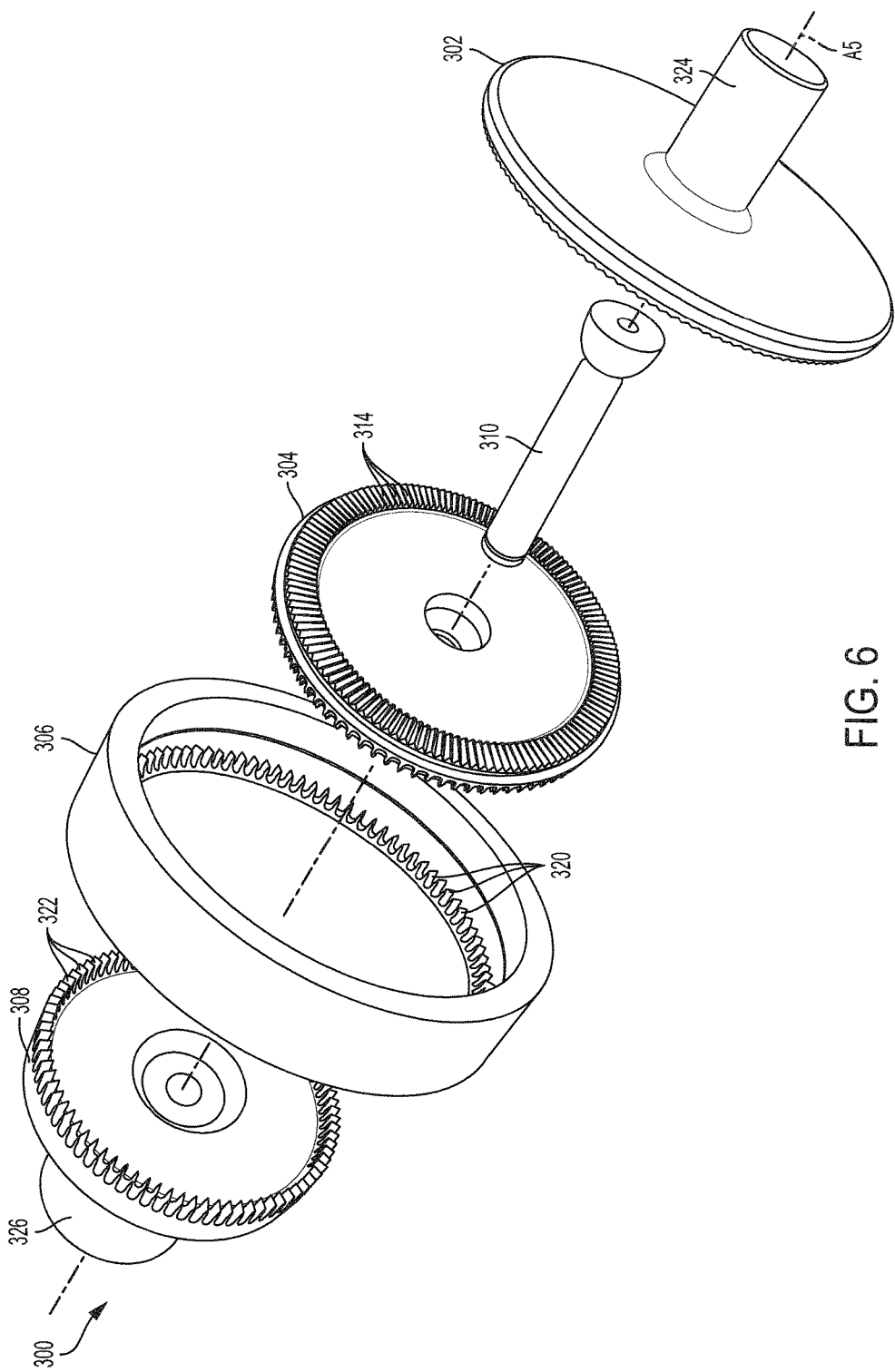
FIG. 6 is a diagrammatic representation of an isometric exploded rear view of the gearbox system of FIG. 4.

FIG. 4 is an isometric view of an exemplary embodiment of an elliptically interfacing gearbox system or gearbox, generally indicated at 300. FIG. 5 is an exploded isometric front view of gearbox 300. FIG. 6 is an exploded isometric rear view of gearbox 300. FIGS. 4-6 are discussed herein as a group. Gearbox 300 may be similar to gearbox 10 described in Example 1. That is, similarly named elements of the embodiments in gearbox system 300 may be similar to elements in gearbox system 10. For example, input plate 302 described below may be similar to input plate 12 described above, etc.

Gearbox 300 may include an input plate 302, a wobble plate 304, a stator gear 306, an output plate 308, and a support shaft 310. Input plate 302 may have a rotation axis A5. Wobble plate 304 may have a wobble axis disposed at a non-zero angle relative to the rotation axis. The angle between the wobble axis and the rotation axis A5 may be small and difficult to discern in FIGS. 4-6. The wobble axis can be seen, for example, in FIG. 16 and the angle between the wobble axis and the rotation axis A5 can be seen, for example, in FIG. 29.

The input plate 302 may include a plurality of input teeth 312. The wobble plate 304 may include a plurality of face teeth 314, a first plurality of wobble teeth 316, and a second plurality of wobble teeth 318. The stator 306 may include a plurality of stator teeth 320. The output plate 308 may include a plurality of output teeth 322.

The input plate 302 may be coupled to an input shaft 324 and the output plate 308 may be coupled to an output shaft 326. The input shaft, the output shaft, and the support shaft 310 may be aligned along the rotation axis A5.

Figure 7:
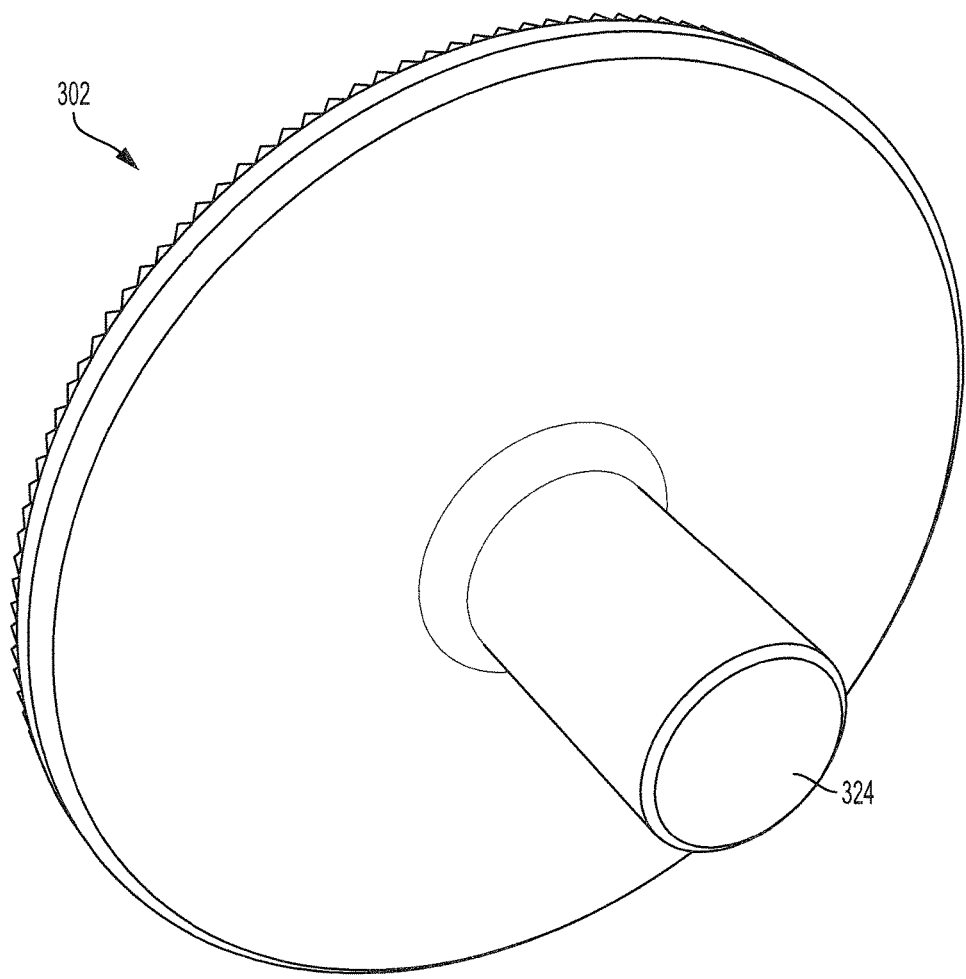
FIG. 7 is a diagrammatic representation of an isometric rear view of an input plate of the gearbox system of FIG. 4, showing an input shaft.

FIG. 7 is a rear isometric view of input plate 302. Input shaft 324 may be directly coupled to input plate 302 so that a single rotation of the input shaft may result in a single rotation of the input plate.

Figure 8:
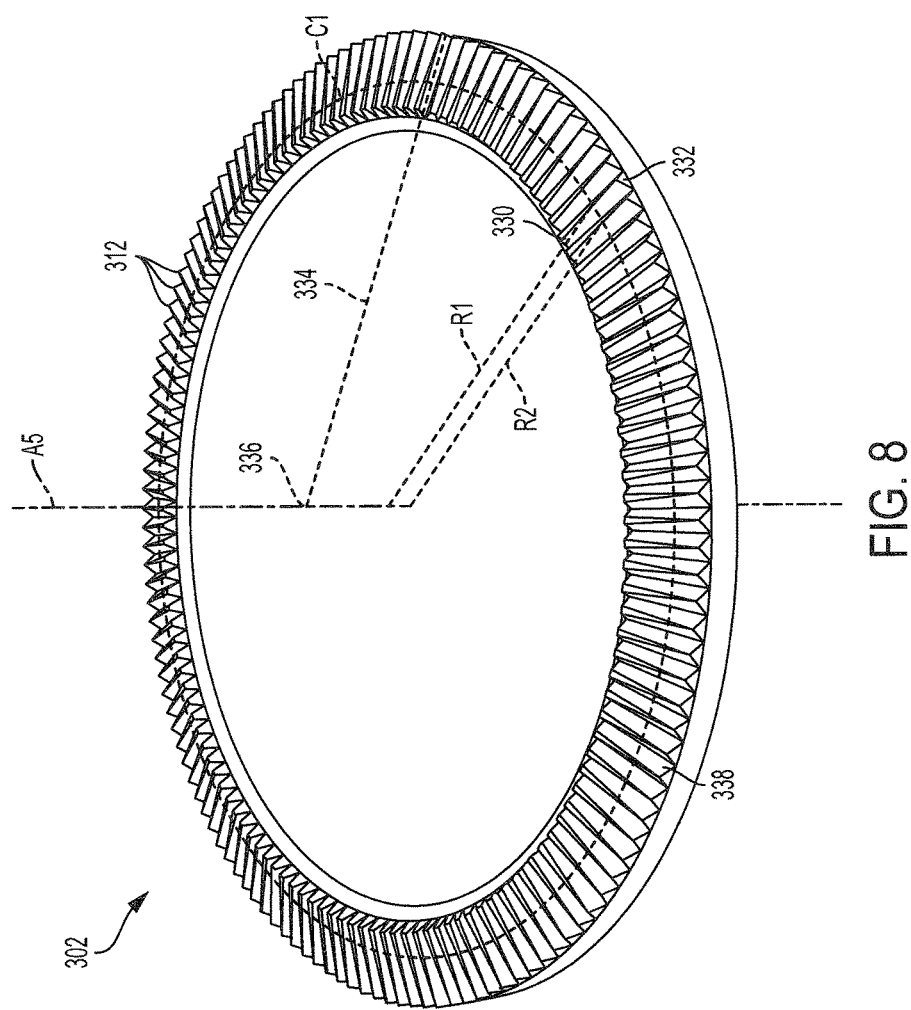
FIG. 8 is a diagrammatic representation of an isometric front view of the input plate of FIG. 4, showing a plurality of input teeth.

FIG. 8 is a front isometric view of input plate 302 showing the plurality of input teeth 312. The plurality of input teeth 312 may be disposed on an annular input surface 328, best seen in FIGS. 9 and 10. Annular input surface 328 may have an inner radius R1 and an outer radius R2 as measured from the rotation axis A5. Each of the plurality of input teeth may have a proximal end 330 proximate inner radius R1 and a distal end 332 proximate outer radius R2.

Annular input surface 328 may be a frustoconical surface. That is, the annular input surface may be angled relative to a plane perpendicular to the rotation axis A5, so that every point on the annular input surface includes a frustoconical line 334 that can be extended to a frustoconical apex 336 located on the rotation axis and above the input plate 302. When assembled with the rest of gearbox system 300, the frustoconical apex 336 of the annular input surface may be proximate a center of mass of the wobble plate 304.

A count of the plurality of input teeth 312 may be any appropriate number. The count of input teeth may be more, less, or the same as a count of the plurality of face teeth. In the exemplary embodiment depicted in FIG. 8 there are 135 input teeth.

Figure 9:
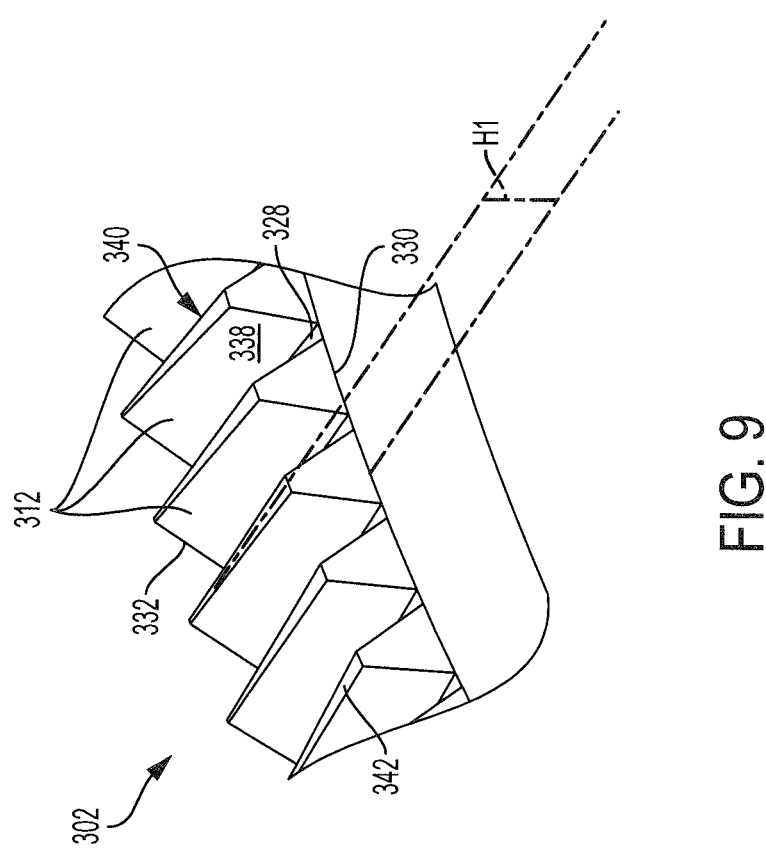
FIG. 9 is a diagrammatic representation of a detailed view of FIG. 8, showing several input teeth of the input plate of FIG. 4.

FIG. 9 is a detailed view of input plate 302 showing several input teeth 312 disposed on annular input surface 328. Each input tooth may include a first driving face 338. The first driving face 338 may be seen more clearly in FIG. 8. The first diving face may extend from the proximal end 330 to the distal end 332 of an input tooth. The first driving face may be planar, composed of more than one plane, or may be composed of one or more surfaces with curvature.

On the opposite side of an input tooth 312 from the first driving face 338 may be a second driving face 340. The second driving face may extend from the proximal end 330 to the distal end 332 of an input tooth. Second driving face 340 may be planar, composed of more than one plane, or may be composed of one or more surfaces with curvature.

Each input tooth 312 may have an upper surface 342 extending from the first driving face 338 to the second driving face 340. The upper surface 342 may define an input tooth height H1 as the distance between the annular input surface 328 and the upper surface 342 of the input tooth, as measured along a direction parallel to the rotation axis. The input tooth height H1 may or may not be constant along an input tooth. The input tooth height H1 may have a minimum value proximate the proximal end 330 of an input tooth.

Figure 10:
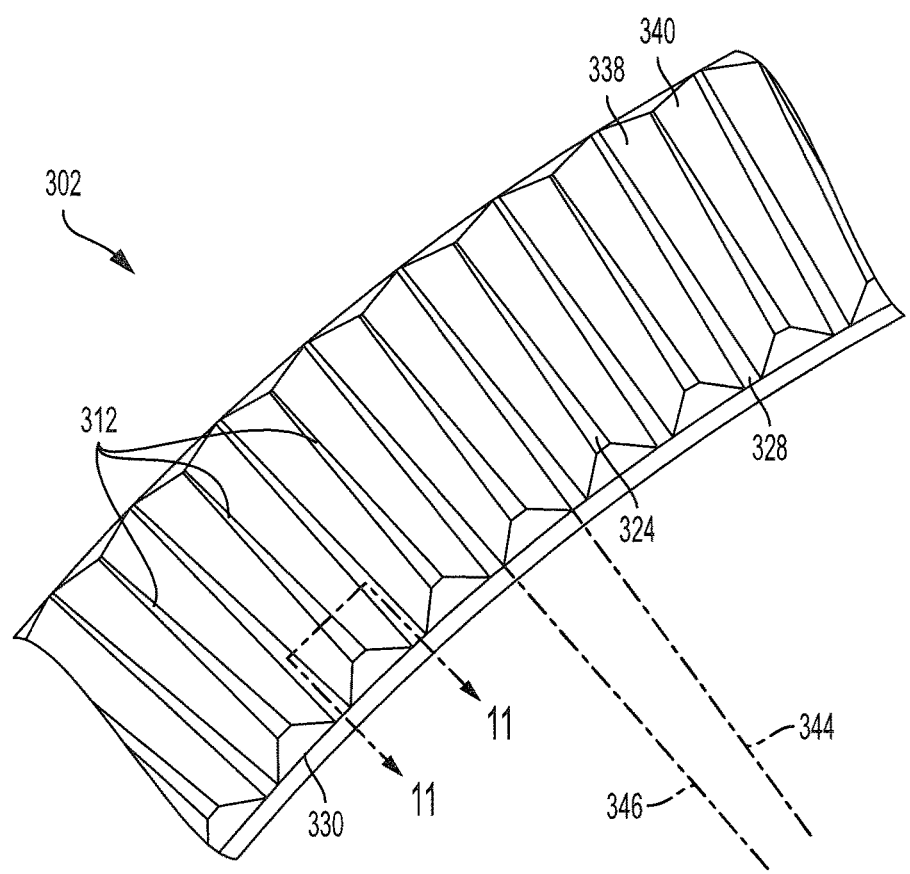
FIG. 10 is a diagrammatic representation of a top plan view of the input plate of FIG. 4, showing a subset of input teeth.

FIG. 10 is a top plan view of input plate 302, showing a subset of input teeth 312. Each input tooth may have a wedge-shaped footprint on the annular input surface 328. That is, a line 344 made by the junction of the first driving face 338 with the annular input surface 328 may extend through the rotation axis. Another line 346 made by the junction of the second driving face 340 with the annular input surface may extend through the rotation axis.

Figure 11:
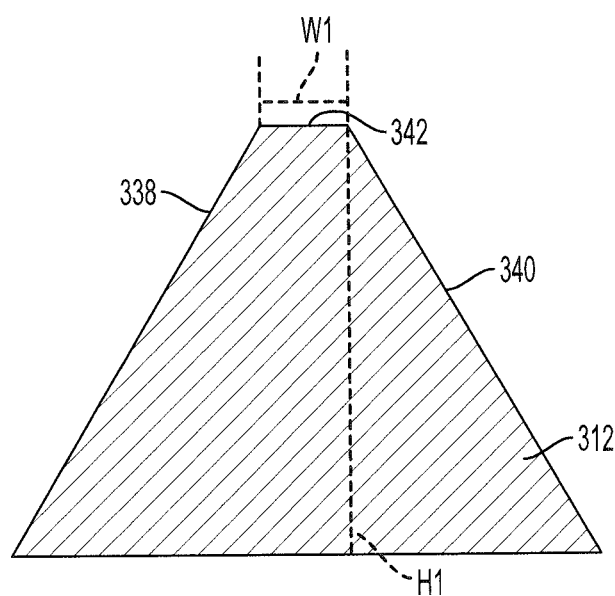
FIG. 11 is a diagrammatic representation of a cross-sectional view of a single input tooth, taken along plane 11-11 in FIG. 10.

FIG. 11 is a cross-sectional view, taken along plane 11-11 in FIG. 10, of an exemplary single input tooth 312. One or both of the first driving face 338 and the second driving face 340 may be substantially planar. The upper surface 342 of each input tooth may have a width W1. The width of the upper surface may vary along the input tooth, see for example in FIG. 10. The width W1 may have a maximum value proximate the proximal end 330 of an input tooth, see FIG. 10. The width W1 may vary along the input tooth as the height H1 varies.

Figure 12:
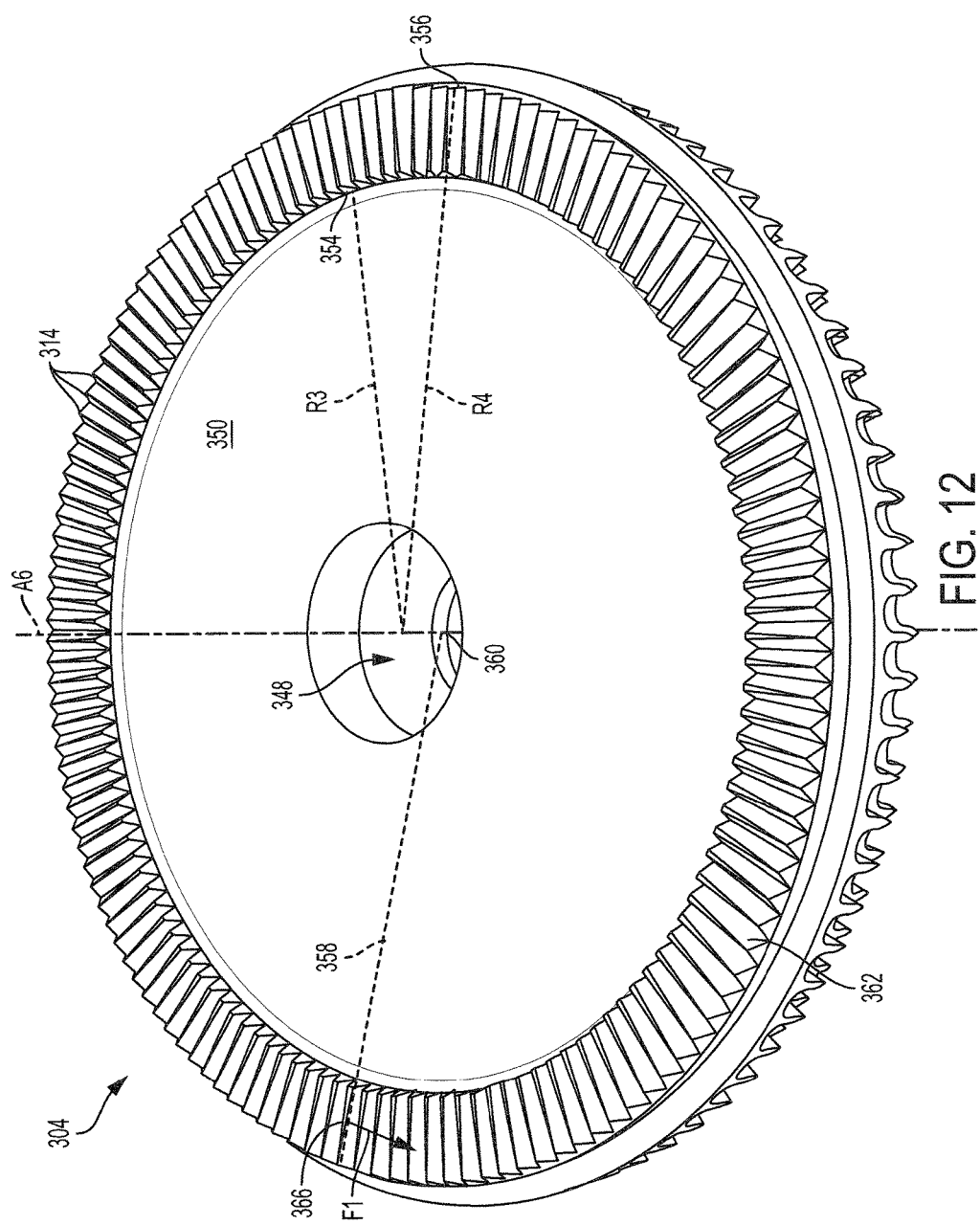
FIG. 12 is a diagrammatic representation of an isometric rear view of a wobble plate of the gearbox system of FIG. 4, showing a plurality of face teeth.

FIG. 12 is a rear isometric view of a wobble plate 304. Wobble plate 304 may include a socket 348 which may be configured to receive a ball portion of the support shaft, see for example in FIG. 29. Wobble plate 304 may have a wobble axis A6.

The plurality of face teeth 314 may be disposed on a rear face 350 of the wobble plate 304. In particular, the plurality of face teeth 314 may be disposed on an annular wobble surface 352, which may form a portion of the rear face of the wobble plate 304. Annular wobble surface 352 may be best seen in FIGS. 13 and 14. Annular wobble surface 352 may have an inner radius R3 and an outer radius R4 as measured from the wobble axis A6. Each of the plurality of face teeth 314 may have a proximal end 354 proximate inner radius R3 and a distal end 356 proximate outer radius R4.

Annular wobble surface 352 may be a frustoconical surface. That is, the annular wobble surface may be angled relative to a plane perpendicular to the wobble axis A6, so that every point on the annular wobble surface includes a frustoconical line 358 that can be extended to a frustoconical apex 360 located on the wobble axis and within socket 348. The frustoconical apex 360 of the annular wobble surface may be proximate a center of mass of the wobble plate 304.

A count of the plurality of face teeth 314 may be any appropriate number. The count of face teeth may be more, less, or the same as a count of the plurality of input teeth. In the exemplary embodiment depicted in FIG. 12 there are 135 face teeth.

Figure 13:
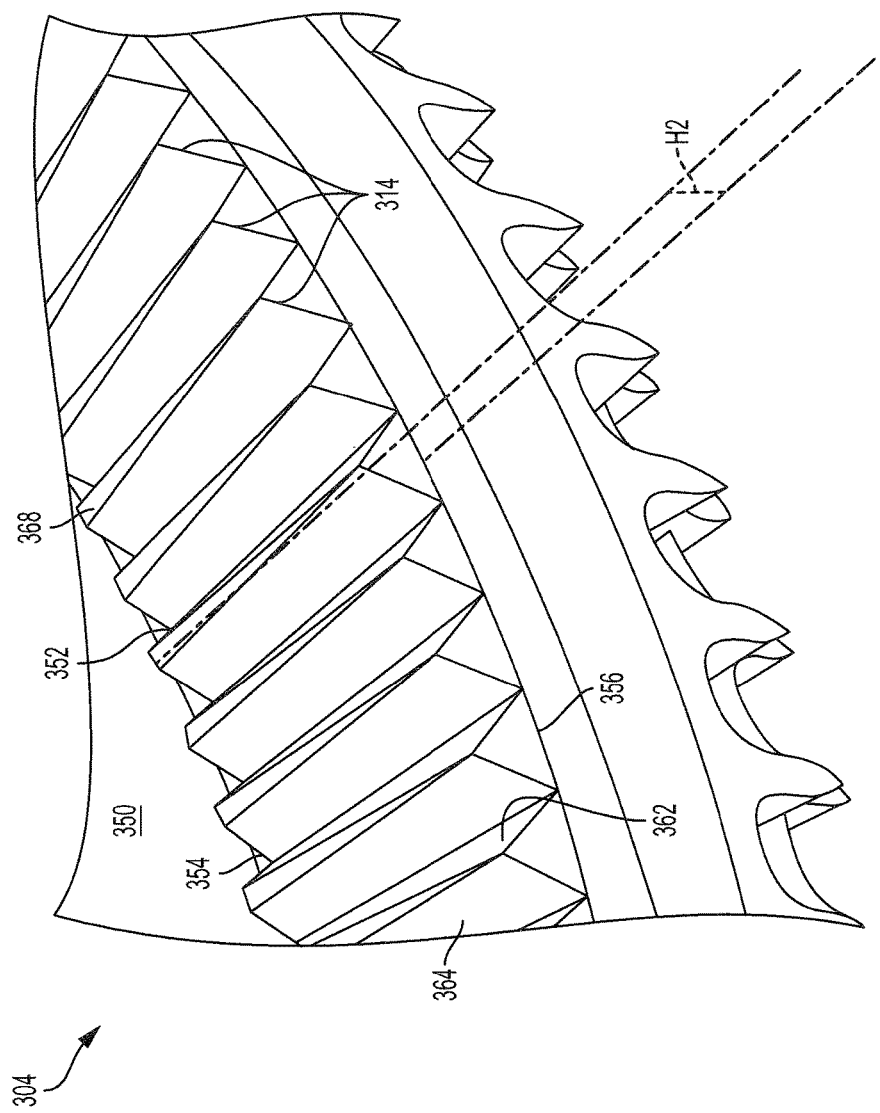
FIG. 13 is a diagrammatic representation of a detailed view of FIG. 12, showing several face teeth of the wobble plate of FIG. 4.

FIG. 13 is a detailed view of wobble plate 304, showing several face teeth 314 disposed on the annular wobble surface 352 of the rear face 350 of the wobble plate. Each face tooth may include a first driven face 362. The first driven face may extend from the proximal end 354 to the distal end 356 of a face tooth. First driven face 362 may be planar, composed of more than one plane, or may be composed of one or more surfaces with curvature.

Wobble plate 304 may engage with input plate 302. The engagement may be between the plurality of face teeth and input teeth. In the case where the input plate rotates in a first rotation direction the first driving face of an input tooth may engage with the first driven face of a face tooth. That is, there may be a contact force exerted on the wobble plate by the input plate through an interaction between the first driving faces of the plurality of input teeth and the first driven faces of the plurality of face teeth. These contact forces may cause the wobble plate to rotate in the first rotation direction.

In the exemplary embodiment of gearbox 300, the input plate has 135 input teeth and the wobble plate has 135 face teeth. That is, the input plate and the wobble plate interact and rotate according to a first gear ratio of 1:1. That is, for every single complete rotation of the input plate, the wobble plate also completes exactly one complete rotation. Other choices for the numbers of input and face teeth are possible and would lead to other values for the first gear ratio.

On the opposite side of a face tooth 314 from the first driven face 362 may be a second driven face 364. The second driven face may extend from the proximal end 354 to the distal end 356 of a face tooth. Second driven face 364 may be planar, composed of more than one plane, or may be composed of one or more surfaces with curvature. In the case where the input plate rotates in a second rotation direction, contact forces between the second driving faces of the input teeth and the second driven faces of the face teeth may cause the wobble plate to rotate in the second rotation direction.

The wobble plate and the input plate may be configured so that any contact forces exerted between them will point in directions that are tangent to circles which lie in planes perpendicular to the rotation axis. For example, contact forces exerted on the plurality of input teeth by the plurality of face teeth may be tangent to circle C1, see FIG. 8. In another example, a contact force may be exerted on a face tooth 314 of the wobble plate by an input tooth of the input plate at point of contact 366, the contact force indicated by an arrow at F1 in FIG. 12. Contact force F1 may point in a direction that is substantially perpendicular to the wobble axis A6 and to the radial line 358 extending from the point of contact 366 to the wobble axis A6.

By configuring the wobble plate and input plate so that contact forces between them point in such directions, eccentric forces may be avoided. Eccentric forces may cause the plurality of face teeth to disengage from the plurality of input teeth or may cause the center of mass of the wobble plate to oscillate, thereby introducing undesirable vibrations into the gearbox system.

Each face tooth 314 may have a lower surface 368 extending from the first driven face 362 to the second driven face 364. The lower surface 368 may define a face tooth height H2 as the distance between the annular wobble surface 352 and the lower surface 368 of the face tooth, as measured along a direction parallel to the wobble axis. The face tooth height H2 may or may not be constant along a face tooth. The ace tooth height H2 may have a minimum value proximate the proximal end 354 of an input tooth.

Figure 14:
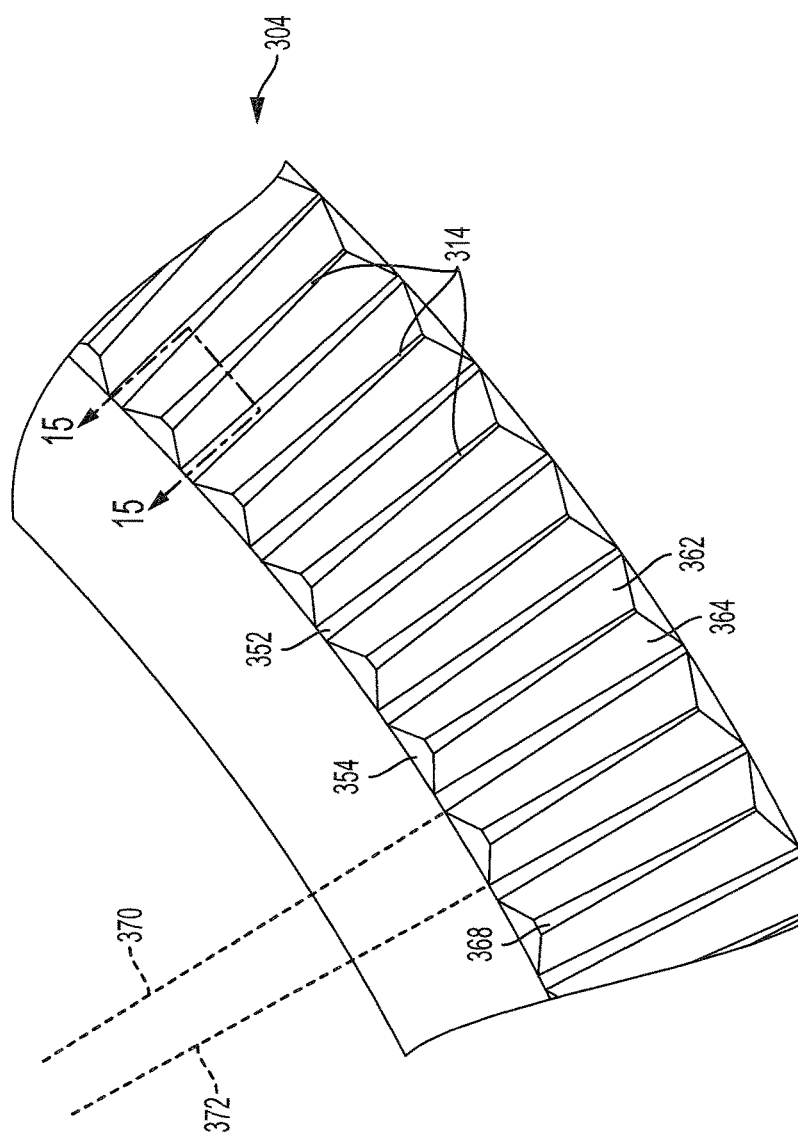
FIG. 14 is a diagrammatic representation of a bottom plan view of the wobble plate of FIG. 4, showing a subset of face teeth.

FIG. 14 is a bottom plan view of wobble plate 304, showing a subset of face teeth 314. Each face tooth may have a wedge-shaped footprint on the annular wobble surface 352. That is, a line 370 made by the junction of the first driven face 362 with the annular wobble surface 352 may extend through the wobble axis. Another line 372 made by the junction of the second driven face 364 with the annular wobble surface may extend through the wobble axis.

Figure 15:
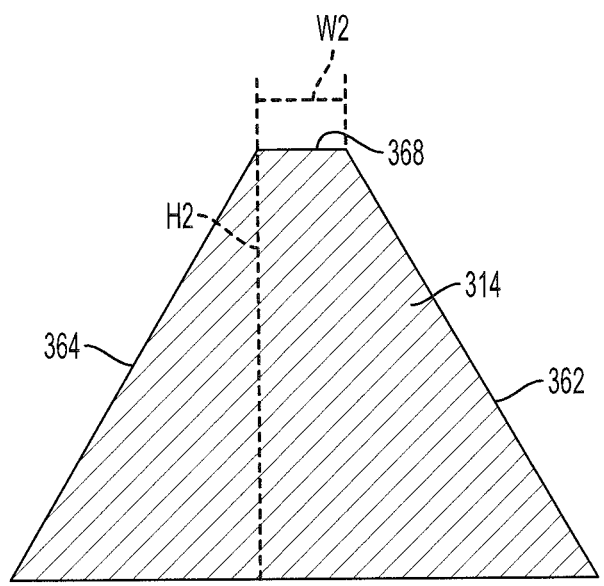
FIG. 15 is a diagrammatic representation of a cross-sectional view of a single wobble tooth, taken along plane 15-15 in FIG. 14.

FIG. 15 is a cross-sectional view, taken along plane 15-15 in FIG. 10, of an exemplary single face tooth 314. One or both of the first driven face 362 and the second driven face 364 may be substantially planar. The lower surface 368 of each face tooth may have a width W2. The width of the lower surface may vary along the face tooth, see for example in FIG. 14. The width W2 may have a maximum value proximate the proximal end 354 of a face tooth, see FIG. 14. The width W2 may vary along the face tooth as the height H2 varies.

Figure 16:
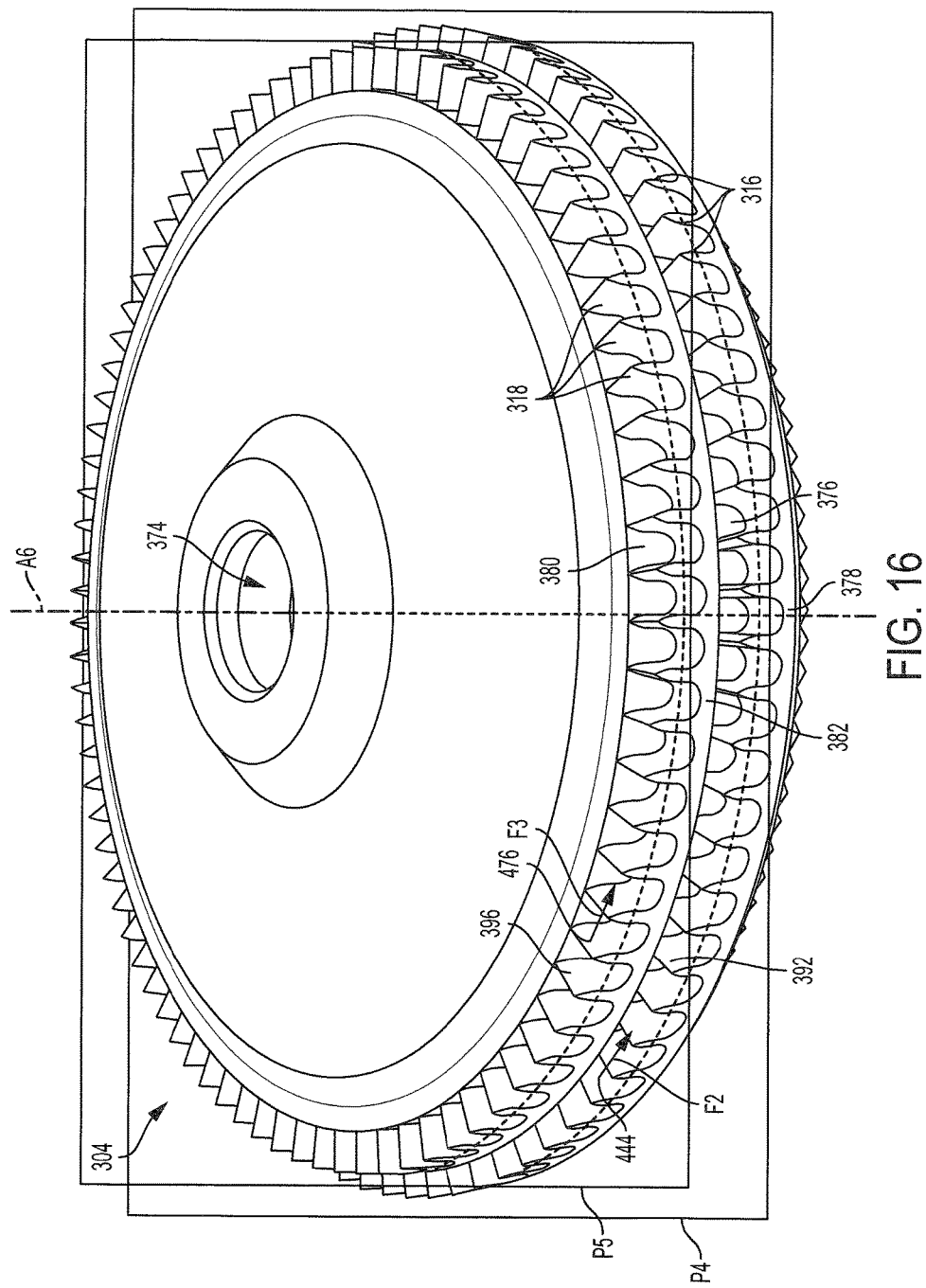
FIG. 16 is a diagrammatic representation of an isometric front view of the wobble plate of FIG. 4, showing a first plurality of wobble teeth and a second plurality of wobble teeth.

FIG. 16 is a front isometric view of wobble plate 304. Wobble plate 304 may include a support shaft aperture 374 which may be configured to receive a portion of support shaft 310, see for example in FIG. 29.

The first plurality of wobble teeth 316 may be disposed in a first plane P4 perpendicular to the wobble axis A6. The first plurality of wobble teeth may extend from a first cylindrical surface 376 of the wobble plate in a radial direction away from the wobble axis. The first plurality of wobble teeth may extend from a first wobble tooth base 378 in an axial direction along the wobble axis. The first wobble tooth base may be an approximately annular member coupled to the wobble plate. The first plurality of wobble teeth may extend from both the first cylindrical surface 376 and the first wobble tooth base 378. Connecting to either or both of the first cylindrical surface or the first wobble tooth base may lend physical support or a degree of rigidity to the first plurality of wobble teeth.

The second plurality of wobble teeth 318 may be disposed in a second plane P5 perpendicular to the wobble axis A6. The second plurality of wobble teeth may extend from a second cylindrical surface 380 of the wobble plate in a radial direction away from the wobble axis. The second plurality of wobble teeth may extend from a second wobble tooth base 382 in an axial direction along the wobble axis. The second wobble tooth base may be an approximately annular member coupled to the wobble plate. The second plurality of wobble teeth may extend from both the second cylindrical surface 380 and the second wobble tooth base 382. Connecting to either or both of the second cylindrical surface or the second wobble tooth base may lend physical support or a degree of rigidity to the second plurality of wobble teeth.

A count of the first plurality of wobble teeth 316 may be any appropriate number. The count of the first plurality of wobble teeth may be more, less, or the same as a count of the plurality of stator teeth. In the exemplary embodiment shown in FIG. 16, there are ninety teeth in the first plurality of wobble teeth.

A count of the second plurality of wobble teeth 318 may be any appropriate number. The count of the second plurality of wobble teeth may be more, less, or the same as a count of the plurality of output teeth. In the exemplary embodiment shown in FIG. 16, there are eighty-five teeth in the second plurality of wobble teeth.

Figure 17:
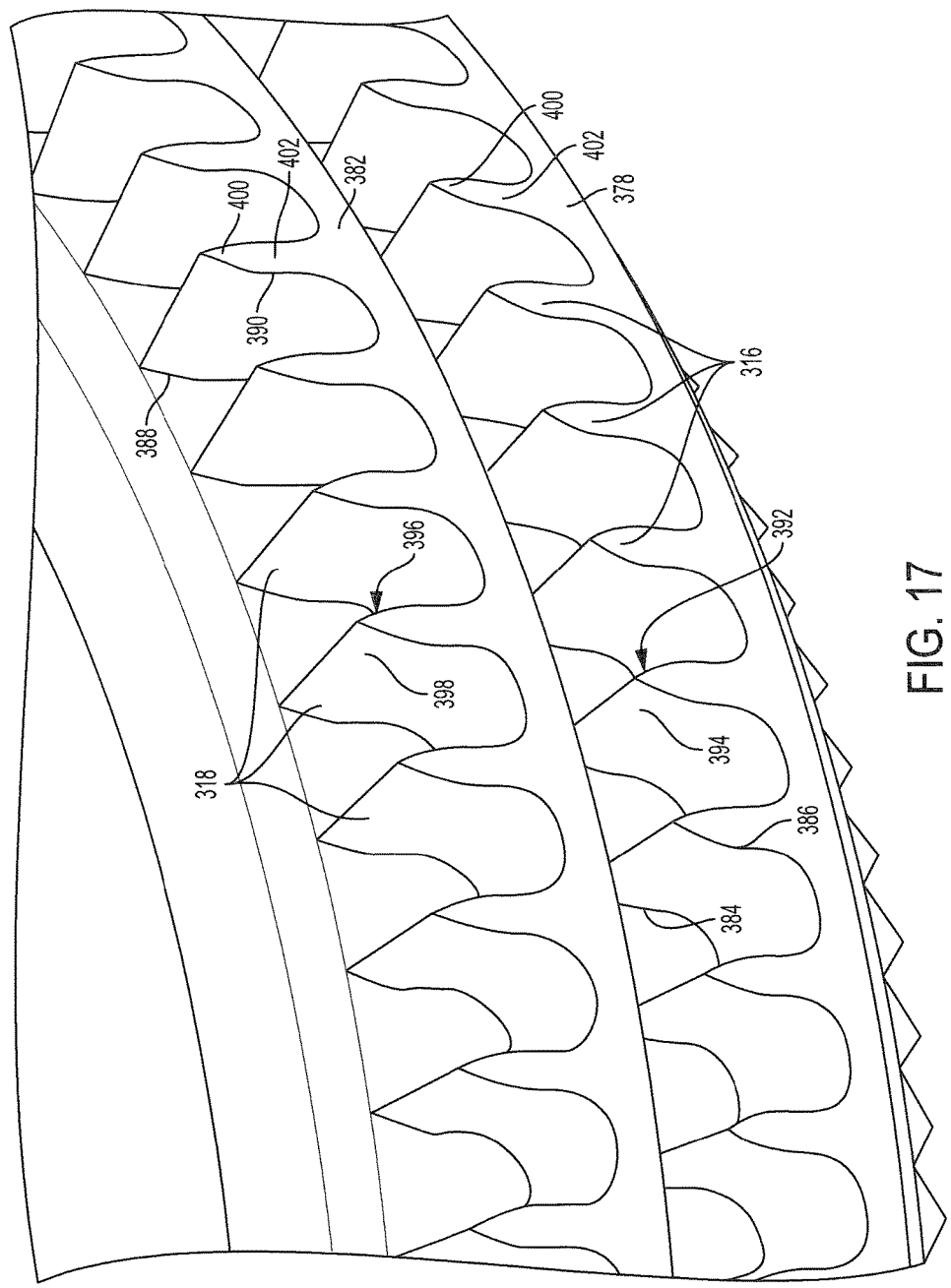
FIG. 17 is a diagrammatic representation of a detailed view of FIG. 16, showing subsets of the first plurality of wobble teeth and the second plurality of wobble teeth of the wobble plate of FIG. 4.

FIG. 17 is a detailed view of wobble plate 304, showing several of the first plurality of wobble teeth 316 and the second plurality of wobble teeth 318. Each tooth of the first plurality of wobble teeth 316 may have a proximal end 384 and a distal end 386, relative to the wobble axis A6. Each tooth of the second plurality of wobble teeth 318 may have a proximal end 388 and a distal end 390, relative to the wobble axis.

The first plurality of wobble teeth 316 may be disposed in a first ring having a first inner diameter. The first inner diameter may be measured between proximal ends 384 of two wobble teeth from the first plurality of wobble teeth, the two wobble teeth disposed on opposite sides of the wobble plate from one another.

The second plurality of wobble teeth 318 may be disposed in a second ring having a second inner diameter. The second inner diameter may be measured between proximal ends 388 of two wobble teeth from the second plurality of wobble teeth, the two wobble teeth disposed on opposite sides of the wobble plate from one another. The second inner diameter may be smaller than the first inner diameter. The second ring may be spaced along the wobble axis from the first ring.

Each tooth of the first plurality of wobble teeth 316 may include a first engaging surface 392. First engaging surface 392 may be best seen in FIG. 16. The first engaging surface may extend from the proximal end 384 to the distal end 386. First engaging surface 392 may be planar, composed of more than one plane, or composed of one or more surfaces with curvature.

On the opposite side of a tooth of the first plurality of wobble teeth 316 may be a second engaging surface 394. The second engaging surface may extend from the proximal end 384 to the distal end 386. Second engaging surface 394 may be planar, composed of more than one plane, or composed of one or more surfaces with curvature.

Each tooth of the second plurality of wobble teeth 318 may include a first engaging surface 396. First engaging surface 396 may be best seen in FIG. 16. The first engaging surface may extend from the proximal end 388 to the distal end 390. First engaging surface 396 may be planar, composed of more than one plane, or composed of one or more surfaces with curvature.

On the opposite side of a tooth of the second plurality of wobble teeth 318 may be a second engaging surface 398. The second engaging surface may extend from the proximal end 388 to the distal end 390. Second engaging surface 398 may be planar, composed of more than one plane, or composed of one or more surfaces with curvature.

Each tooth of the first plurality of wobble teeth and the second plurality of wobble teeth may include an engaging portion 400 and a supporting base 402. The engaging portion 400 may include the first engaging surface and the second engaging surface. The supporting base 402 may connect the engaging portion to the first or second wobble tooth base 378 or 382.

Figure 18:
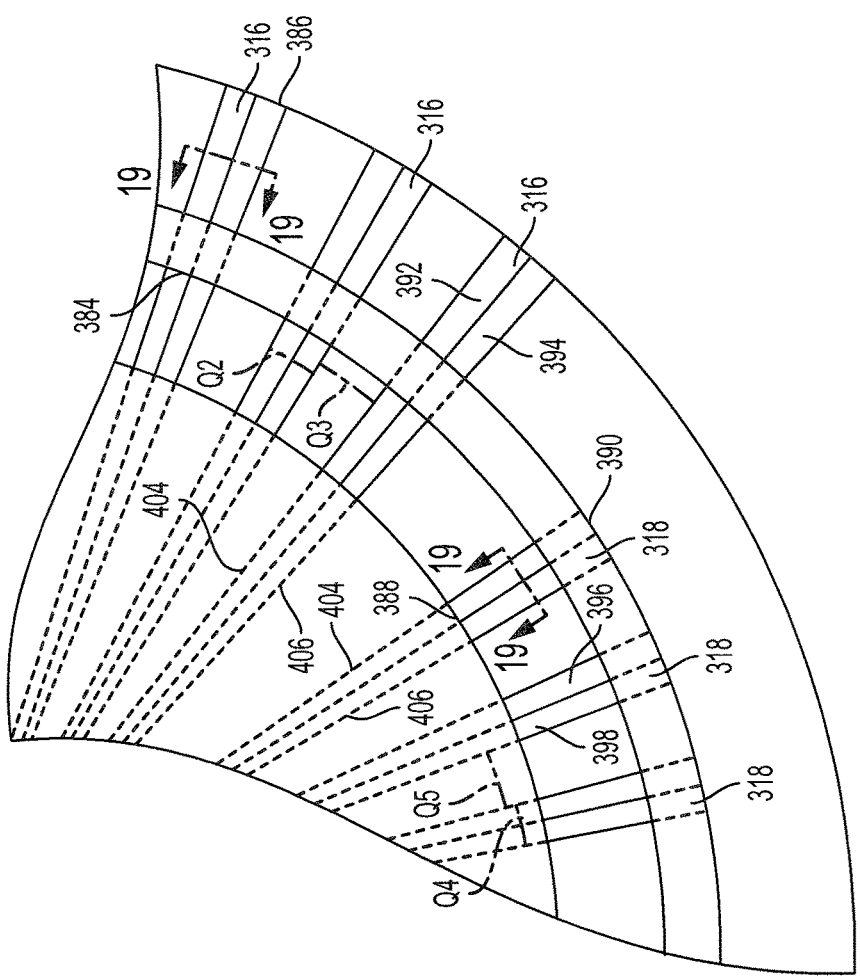
FIG. 18 is a diagrammatic representation of a top plan view of the wobble plate of FIG. 4, showing subsets of the first plurality of wobble teeth and the second plurality of wobble teeth.

FIG. 18 is a top plan view of wobble plate 304, showing a subset of the first plurality of wobble teeth 316 and a subset of the second plurality of wobble teeth 318. Each of the first plurality of wobble teeth and the second plurality of wobble teeth may be wedge shaped. That is, the first engaging surfaces 392 and 396 may include at least one line 404 that is extendable through the wobble axis. Line 404 may pass through the center of mass of the wobble plate. The second engaging surface 394 and 398 may include at least one line 406 that is extendable through the wobble axis. Line 406 may pass through the center of mass of the wobble plate.

Each tooth of the first plurality of wobble teeth 316 may have an angular width Q2 that is less than one half of an angular spacing Q3 between adjacent teeth of the first plurality of wobble teeth, as measured in an angular direction around the wobble axis. Similarly, each tooth of the second plurality of wobble teeth 318 may have an angular width Q4 that is less than one half of an angular spacing Q5 between adjacent teeth of the second plurality of wobble teeth, as measured in an angular direction around the wobble axis. The angular spacing between adjacent teeth in the first plurality of wobble teeth need not be the same as the angular spacing between adjacent teeth in the second plurality of wobble teeth, though of course angular spacings Q3 and Q5 could be the same.

There may or may not be a degree of radial overlap between the first plurality of wobble teeth 316 and the second plurality of wobble teeth 318. In the exemplary embodiment shown in FIG. 12-19, the second plurality of wobble teeth has some overlap with the first plurality of wobble teeth in a radial direction away from the wobble axis. That is, moving outward from the wobble axis may be disposed in order: the proximal ends 388 of the second plurality of wobble teeth, the proximal ends 384 of the first plurality of wobble teeth, the distal ends 390 of the second plurality of wobble teeth, and finally the distal ends 386 of the first plurality of wobble teeth. Of course, the proximal ends 384 of the first plurality of wobble teeth may be disposed in any appropriate way relative to the distal ends 390 of the second plurality of wobble teeth and the wobble axis.

Figure 19:
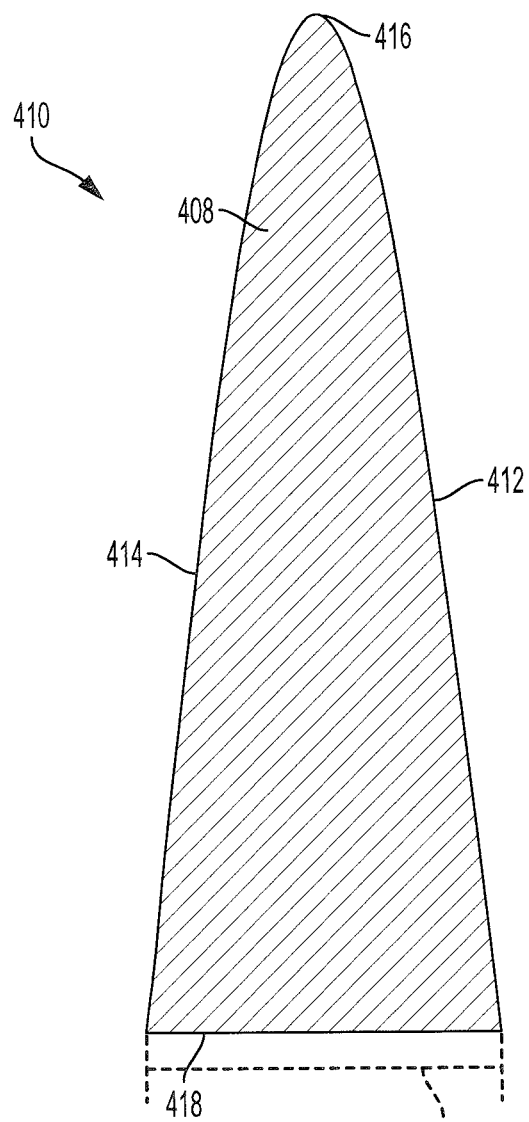
FIG. 19 is a diagrammatic representation of a cross-sectional view of a single wobble tooth, taken along plane 19-19 in FIG. 18.

FIG. 19 is a cross-sectional view of an exemplary engaging portion 408 of a single wobble tooth 410. Wobble tooth 410 could be of the first plurality of wobble teeth or the second plurality of wobble teeth. That is, the cross-sectional shape of teeth from the first plurality of wobble teeth may be the same as the cross-sectional shape of teeth from the second plurality of wobble teeth, up to appropriate scaling. As such, the cross-sectional view shown in FIG. 19 can be taken along plane 19-19 through wobble tooth 316 in FIG. 18, or along plane 19-19 through wobble tooth 318 in FIG. 18.

One or both of a first engaging surface 412 and a second engaging surface 414 may be defined by a compound involute of a circle and an ellipse. That is, the curve of the second engaging surface 414 shown in FIG. 19 may be defined by a first equation:

$$y = C(\tan(\varphi) - \varphi)^D$$

Where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible. The first equation may be normalized to unity.

Alternately, the curve of the second engaging surface 414 shown in FIG. 19 may be defined by a second equation:

$$y = C(\sin(\varphi) - \varphi \cos(\varphi))^D$$

Where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible. The second equation may be normalized to a radius of the wobble plate. The curve of the second engaging surface 414 shown in FIG. 19 may be the projection of a virtual ellipse onto the tooth location for all angles between 0 and $2\pi$ radians.

The curve of first engaging surface 412 may be a mirror image of the curve of second engaging surface 414, reflected across a plane that is vertical in the view of FIG. 19 and perpendicular to the plane of FIG. 19. That is, the first engaging surface may be defined by the compound involute of a circle and an ellipse. The first engaging surface 412 and the second engaging surface 414 may meet smoothly at an apex 416 of each wobble tooth.

A connecting surface 418 may connect the engaging portion 408 of the wobble tooth 410 to the supporting base of the wobble tooth, the supporting base best seen in FIG. 17. A thickness T1 of connecting surface 418, as measured in a direction around the wobble axis of the wobble plate, may grow linearly with radial distance from the wobble axis.

Figure 20:
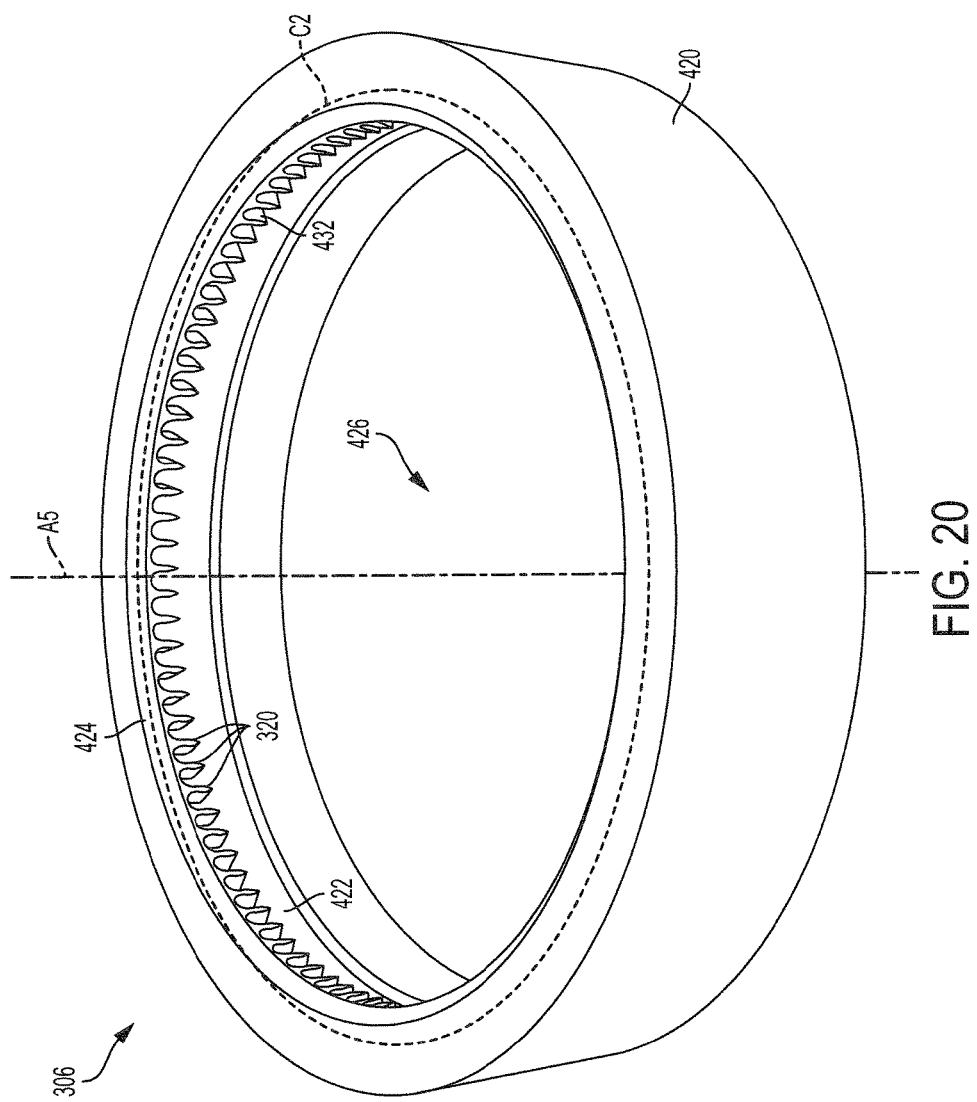
FIG. 20 is a diagrammatic representation of an isometric front view of a stator gear of the gearbox system of FIG. 4, showing a plurality of stator teeth.

FIG. 20 is an isometric view of stator gear or stator 306. Stator gear 306 may have a base 420 and base 420 may include an inner cylindrical surface 422 and a stator tooth base 424. Base 420 may include attachment points configured to operatively couple stator 306 to the rest of whatever device is using gearbox system 300. Stator 306 may be stationary within the context of that device. The stator gear may be substantially aligned along the rotation axis A5.

Stator 306 may have an interior volume 426 which may be partially defined by the inner cylindrical surface 422. Interior volume 426 may be configured to accommodate some or all of the wobble plate as can be seen more clearly in FIG. 29 described below.

The plurality of stator teeth 320 may be disposed on either or both of the inner cylindrical surface 422 and the stator tooth base 424. The plurality of stator teeth may extend from the inner cylindrical surface into the interior volume 426 in a radial direction toward the rotation axis. The plurality of stator teeth may extend from the stator tooth base 424 in an axial direction along the rotation axis. A count of the plurality of stator teeth may be any appropriate number. In the exemplary embodiment shown in FIG. 20, there are ninety-one stator teeth.

Figure 21:
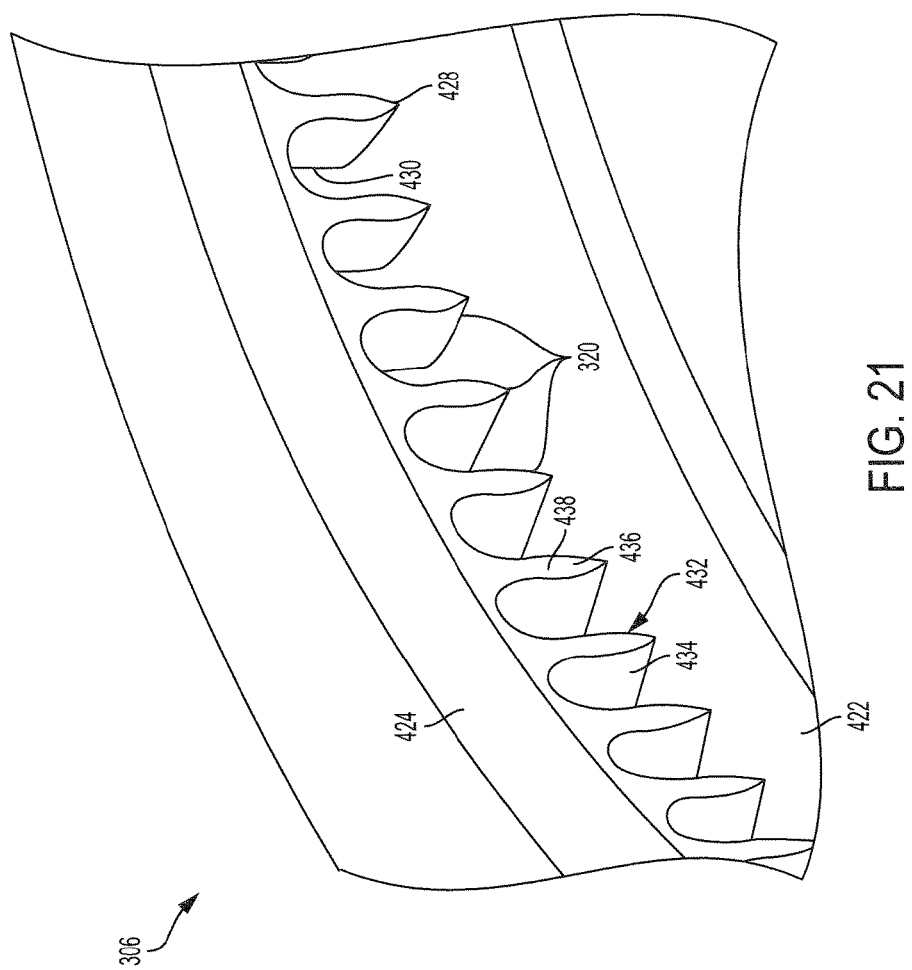
FIG. 21 is a diagrammatic representation of a detailed view of FIG. 20, showing several stator teeth of the stator gear of FIG. 4.

FIG. 21 is a detailed view of stator gear 306 showing several stator teeth 320. Each tooth of the plurality of stator teeth may have a proximal end 428 and a distal end 430, relative to the rotation axis. The distal end 430 of a stator tooth may be coupled to the inner cylindrical surface 422.

Each tooth of the plurality of stator teeth 320 may include a third engaging surface 432. Third engaging surface may be best seen in FIG. 20. The third engaging surface may extend from the proximal end 428 to the distal end 430 of a stator tooth. Third engaging surface 432 may be planar, composed of more than one plane, or composed of one or more surfaces with curvature.

On the opposite side of a stator tooth may be a fourth engaging surface 434. The fourth engaging surface may extend from the proximal end 428 to the distal end 430. Fourth engaging surface 434 may be planar, composed of more than one plane, or composed of one or more surfaces with curvature.

Each tooth of the plurality of stator teeth 320 may include an engaging portion 436 and a supporting base 438. The engaging portion 436 may include the third engaging surface and the fourth engaging surface. The supporting base 438 may couple the engaging portion to the stator tooth base 424.

Stator gear 306 may engage with the wobble plate. The engagement may be between the plurality of stator teeth and the first plurality of wobble teeth. In the case where the input plate rotates in a first rotation direction the first engaging surface of a wobble tooth of the first plurality of wobble teeth may engage with the third engaging surface of a stator tooth. That is, there may be a contact force exerted on the wobble plate by the stator gear through an interaction between the third engaging surfaces of the plurality of stator teeth and the first engaging surfaces of the first plurality of wobble teeth. These contact forces may cause the wobble plate to rotate in the first rotation direction and nutate in a first nutation direction.

In the exemplary embodiment of gearbox 300, the stator gear has ninety-one stator teeth and the wobble plate has ninety teeth in the first plurality of wobble teeth. As the wobble plate nutates around the stator gear, each tooth in the first plurality of wobble teeth may engage with one tooth in the plurality of stator teeth during a single nutation. As there may be one more stator teeth than wobble teeth, the wobble plate may rotate slightly during a single nutation. In the exemplary embodiment of gearbox 300, the wobble plate may rotate 1/91 of a complete rotation during a single nutation of the wobble plate. In other words, if the wobble plate rotates by 1/91 of a complete rotation, perhaps due to an interaction with the input plate, the wobble plate may complete one full nutation. Thus, the wobble plate and the stator gear may interact according to a second gear ratio of 91:1. For every ninety-one nutations of the wobble plate, the wobble plate may rotate exactly once. Other choices for the numbers of stator teeth and the first plurality of wobble teeth are possible and would lead to other values for the second gear ratio.

Figure 22:
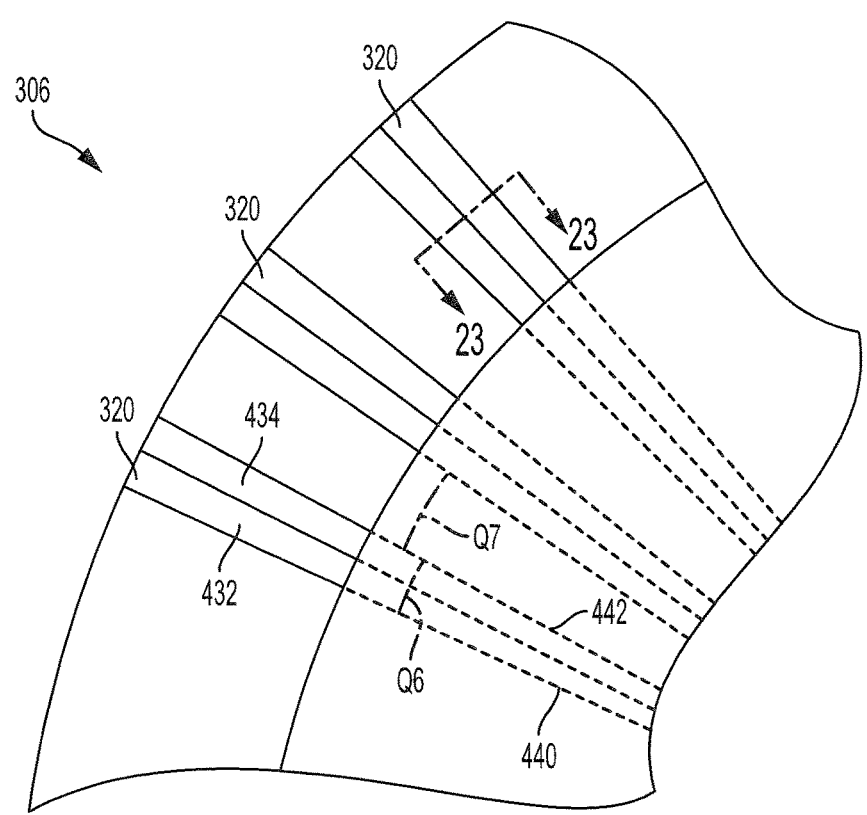
FIG. 22 is a diagrammatic representation of a top plan view of the stator gear of FIG. 4, showing a subset of stator teeth.

FIG. 22 is a bottom plan view of stator gear 306, showing a subset of the plurality of stator teeth 320. Each of the plurality of stator teeth may be wedge-shaped. That is, the third engaging surface 432 may include at least one line 440 that is extendable through the rotation axis. Line 440 may pass through the center of mass of the wobble plate when both the wobble plate and the stator gear are coupled together within the gearbox system. The fourth engaging surface 434 may include at least one line 442 that is extendable through the wobble axis. Line 442 may pass through the center of mass of the wobble plate when both the wobble plate and the stator gear are coupled together within the gearbox system.

The wobble plate and the stator gear may be configured so that any contact forces exerted between them will point in directions that are tangent to circles which lie in planes perpendicular to the rotation axis. For example, contact forces exerted on the plurality of stator teeth by the first plurality of wobble teeth may be tangent to circle C2, see FIG. 20. In another example, a contact forces may be exerted on a wobble tooth of the first plurality of wobble teeth by a stator tooth at a point of contact 444, see FIG. 16, the contact force indicated by an arrow at F2 in FIG. 16. Contact force F2 may point in a direction that is substantially perpendicular to the wobble axis A6 and to a radial line extending from the point of contact 444 to the wobble axis A6.

By configuring the wobble plate and the stator gear so that contact forces between them point in such directions, eccentric forces may be avoided. Eccentric forces may cause the first plurality of wobble teeth to disengage from the plurality of stator teeth or may cause the center of mass of the wobble plate to oscillate, thereby introducing undesirable vibrations into the gearbox system.

Each tooth of the plurality of stator teeth 320 may have an angular width Q6 that is less than one half of an angular spacing Q7 between adjacent teeth of the plurality of stator teeth, as measured in a direction around the rotation axis. Referring also to FIG. 18, the angular width Q2 of a wobble tooth of the first plurality of wobble teeth may be less than one half of the angular spacing Q7 between adjacent stator teeth.

Figure 23:
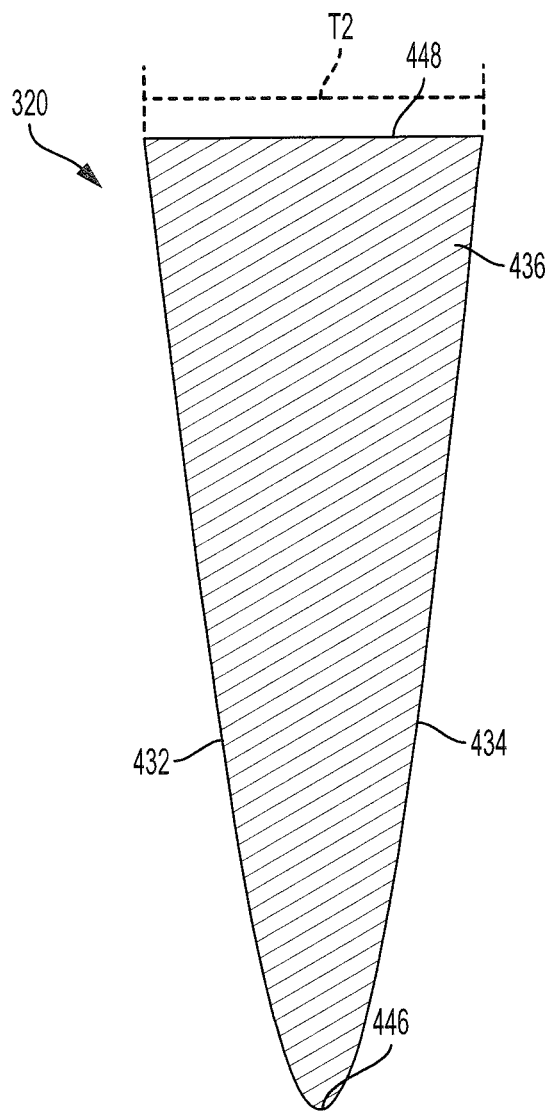
FIG. 23 is a diagrammatic representation of a cross-sectional view of a single stator tooth, taken along plane 23-23 in FIG. 22.

FIG. 23 is a cross-sectional view of an exemplary engaging portion 436 of a single stator tooth 320, taken along plane 23-23 in FIG. 22. One or both of the third engaging surface 432 and the fourth engaging surface 434 may be defined by a compound involute of a circle and an ellipse, as described in reference to FIG. 19.

The third engaging surface 432 and the fourth engaging surface 434 may meet smoothly at an apex 446 of each stator tooth. The curve of the third engaging surface may be a mirror image of the fourth engaging surface, reflected across a plane that is vertical in the view of FIG. 23, perpendicular to the plane of FIG. 23, and passes through apex 446.

A connecting surface 448 may connect the engaging portion 436 of the stator tooth 320 to the supporting base of the stator tooth, the supporting base best seen in FIG. 21. A thickness T2 of connecting surface 448, as measured in a direction around the rotation axis, may grow linearly with radial distance from the rotation axis.

Figure 24:
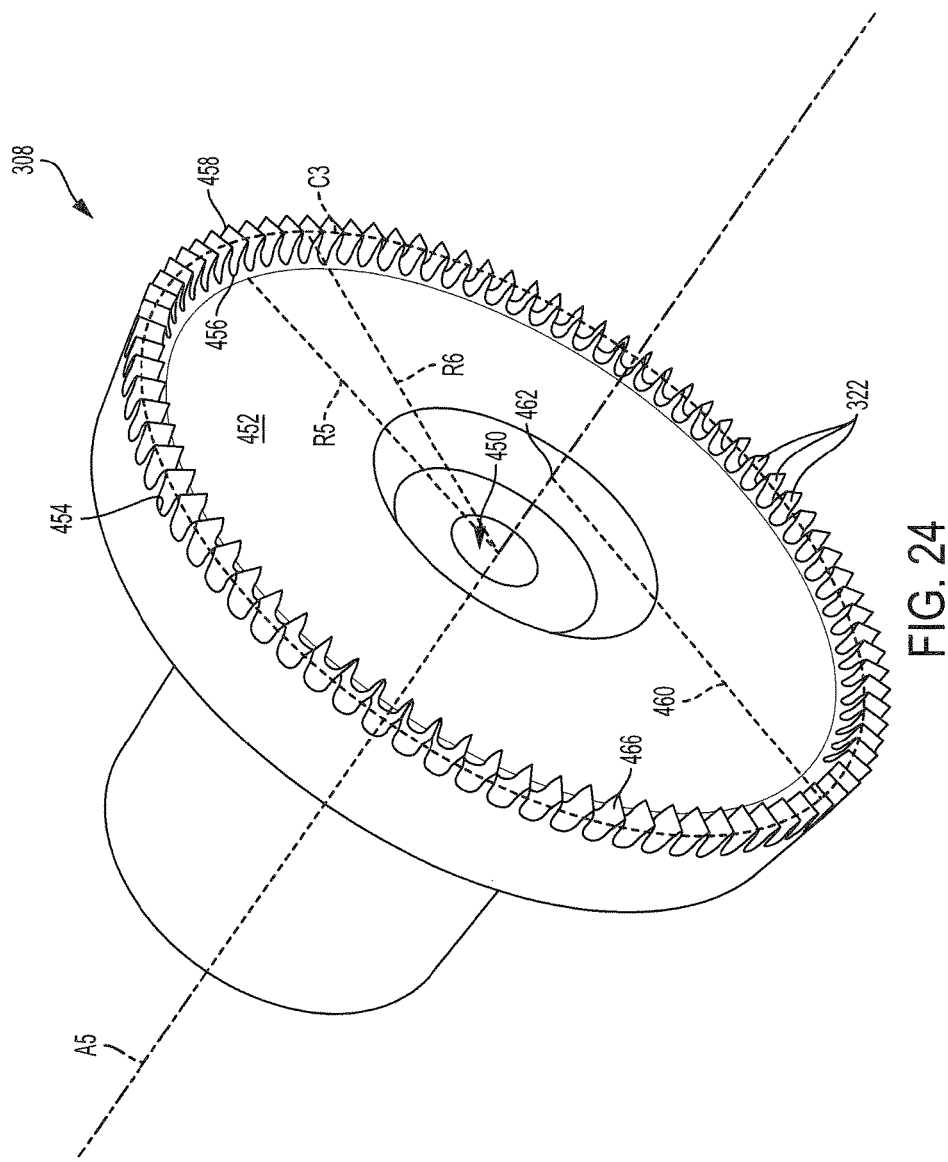
FIG. 24 is a diagrammatic representation of an isometric rear view of an output plate of the gearbox system of FIG. 4, showing a plurality of output teeth.

FIG. 24 is a rear isometric view of output plate 308. Output plate 308 may have a support shaft aperture 450 configured to receive a portion of the support shaft, see for example in FIG. 29. Output plate 308 and output shaft 326 may be aligned along rotation axis A5.

The plurality of output teeth 322 may be disposed on a rear face 452 of the output plate 308. In particular, the plurality of output teeth may be disposed on an annular output surface 454, which may form a portion of the rear face of the output plate. Annular output surface 454 may have an inner radius R5 and an outer radius R6 as measured from the rotation axis. Each of the plurality of output teeth may have a proximal end 456 proximate inner radius R5 and a distal end 458 proximate the outer radius R4. A count of the plurality of output teeth may be any appropriate number. In the exemplary embodiment shown in FIG. 24, there are eighty-six output teeth.

Annular output surface 454 may be a frustoconical surface. That is, the annular output surface may be angled relative to a plane perpendicular to the rotation axis A5, so that every point on the annular output surface includes a frustoconical line 460 that can be extended to a frustoconical apex 462 located on the rotation axis. The frustoconical apex 462 may proximate a center of mass of the wobble plate when the wobble plate and the output plate are both included in gearbox system 300.

Figure 25:
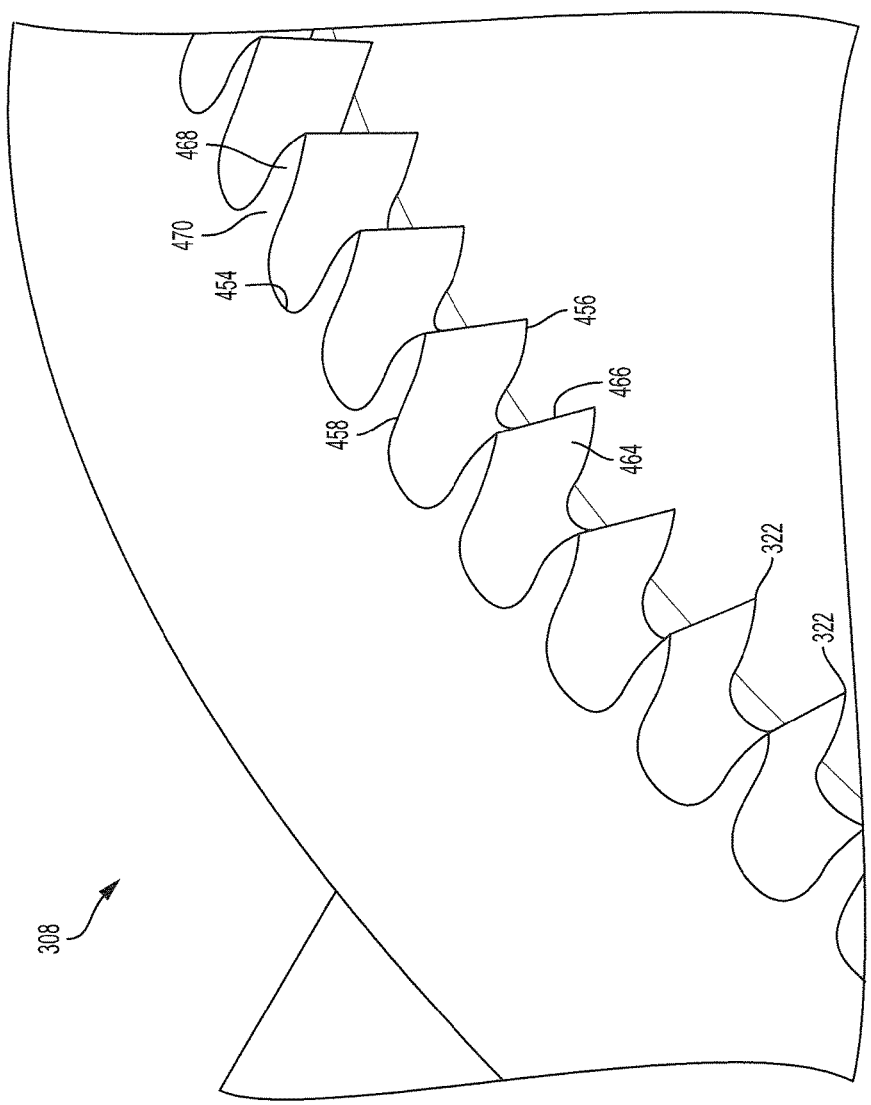
FIG. 25 is a diagrammatic representation of a detailed view of FIG. 24, showing several output teeth of the output plate of FIG. 4.

FIG. 25 is a detailed view of output plate 308 showing several output teeth 322. Each tooth of the plurality of output teeth may include a third engaging surface 464. The third engaging surface may extend from the proximal end 456 to the distal end 458 of the output tooth. Third engaging surface 464 may be planar, composed of more than one plane, or composed of one or more surfaces with curvature.

On the opposite side of an output tooth may be a fourth engaging surface 466. Fourth engaging surface 466 may be best seen in FIG. 24. The fourth engaging surface may extend from the proximal end 456 to the distal end 458. Fourth engaging surface 466 may be planar, composed of more than one plane, or composed of one or more surfaces with curvature.

Each tooth of the plurality of output teeth 322 may include an engaging portion 468 and a supporting base 470. The engaging portion 468 may include the third engaging surface and the fourth engaging surface. The supporting base 470 may couple the engaging portion to the annular output surface 454.

Output plate 308 may engage with the wobble plate. The engagement may be between the plurality of output teeth and the second plurality of wobble teeth. In the case where the wobble plate nutates in a first nutation direction, the first engaging surface of a wobble tooth of the second plurality of wobble teeth may engage with the third engaging surface of an output tooth. That is, there may be a contact force exerted on the output plate by the wobble plate through an interaction between the third engaging surfaces of the plurality of output teeth and the first engaging surfaces of the second plurality of wobble teeth. These contact forces may cause the output plate to rotate in a first rotation direction as the wobble plate nutates about the stator.

In the exemplary embodiment of gearbox 300, the output plate has eighty-six output teeth and the wobble plate has eighty-five teeth in the second plurality of wobble teeth. As the wobble plate nutates around the stator gear and the output plate, each tooth in the second plurality of wobble teeth may engage with one tooth in the plurality of output teeth during a single nutation. As there may be one more output teeth than wobble teeth, the wobble plate may rotate slightly with respect to the output plate during a single nutation. The rotation of the wobble plate may be determined by an interaction with the input plate.

In the exemplary embodiment of gearbox 300, the output plate may rotate 1/86 of a complete rotation with respect to the wobble plate during a single nutation of the wobble plate. Thus, the wobble plate and the output plate may interact according to a second gear ratio of 86:1. For every 86 nutations of the wobble plate, the output plate may rotate exactly once with respect to the wobble plate.

It may be the case that, as the wobble plate nutates around the stator, the wobble plate rotates in a first direction with respect to the stator and the output plate rotates in a second direction with respect to the wobble plate. The first rotation direction and the second rotation direction may be opposite, and the amounts of rotation in the first rotation direction and the second direction may be different. That is, during a single nutation, the wobble plate may rotate with respect to the stator in a first rotation direction by 1/91 of a complete rotation and the output plate may rotate with respect to the wobble plate in a second direction by 1/86 of a complete rotation. Thus, the output plate may rotate with respect to the stator by (1/86-1/91) of a complete rotation for every nutation of the wobble plate. Thus configured, it may take approximately 1565 nutations of the wobble plate for the output plate to rotate once, a total gear ratio for the gearbox system of 1565:1.

Figure 26:
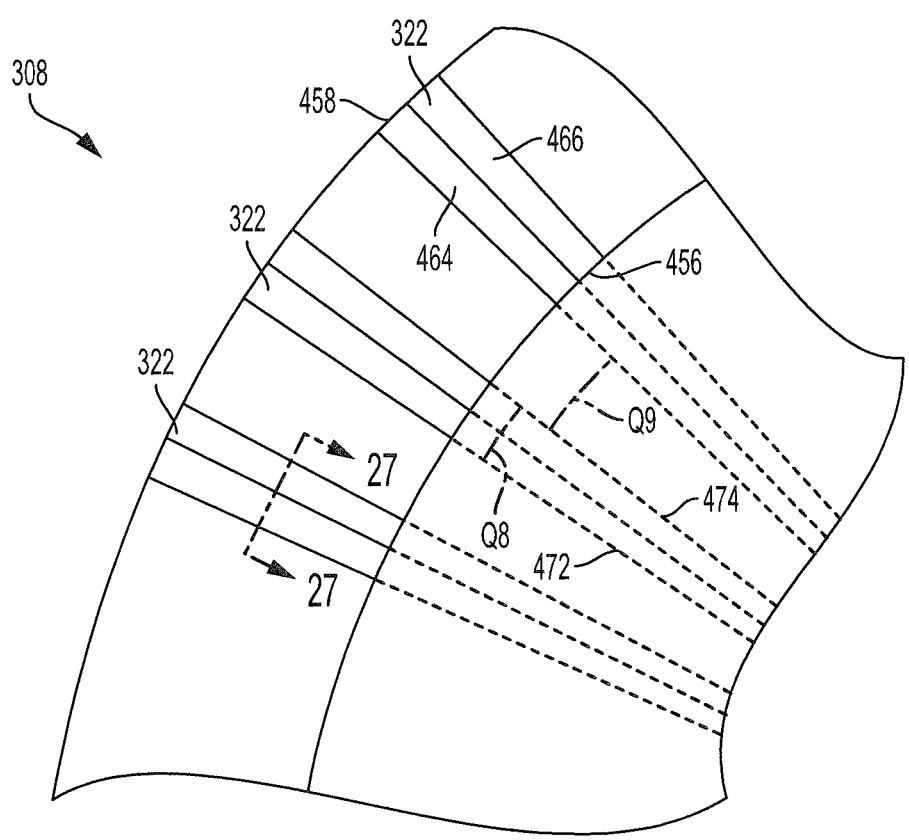
FIG. 26 is a diagrammatic representation of a bottom plan view of the output plate of FIG. 4, showing a subset of output teeth.

FIG. 26 is a bottom plan view of output plate 308, showing a subset of the plurality of output teeth 322. Each of the plurality of output teeth may be wedge-shaped. That is the third engaging surface 464 may include at least one line 472 that is extendable through the rotation axis. Line 472 may pass through the center of mass of the wobble plate when both the wobble plate and the output plate are coupled together within the gearbox system. The fourth engaging surface 466 may include at least one line 474 that is extendable through the wobble axis. Line 474 may pass through the center of mass of the wobble plate when both the wobble plate and the output plate are coupled together within the gearbox system.

The wobble plate and the output plate may be configured so that any contact forces exerted between them will point in directions that are tangent to circles which lie in planes perpendicular to the rotation axis. For example, contact forces exerted on the plurality of output teeth by the second plurality of wobble teeth may be tangent to circle C3, see FIG. 24. In another example, a contact forces may be exerted on a wobble tooth of the second plurality of wobble teeth by an output tooth at a point of contact 476, see FIG. 16, the contact force indicated by an arrow at F3 in FIG. 16. Contact force F2 may point in a direction that is substantially perpendicular to the wobble axis A6 and to a radial line extending from the point of contact 476 to the wobble axis A6.

By configuring the wobble plate and the output plate so that contact forces between them point in such directions, eccentric forces may be avoided. Eccentric forces may cause the second plurality of wobble teeth to disengage from the plurality of output teeth or may cause the center of mass of the wobble plate to oscillate, thereby introducing undesirable vibrations into the gearbox system.

Each tooth of the plurality of output teeth 322 may have an angular width Q8 that is less than one half of an angular spacing Q8 between adjacent teeth of the plurality of output teeth, as measured in a direction around the rotation axis. Referring also to FIG. 18, the angular width Q4 of a wobble tooth of the second plurality of wobble teeth may be less than one half of the angular spacing Q9 between adjacent output teeth.

Figure 27:
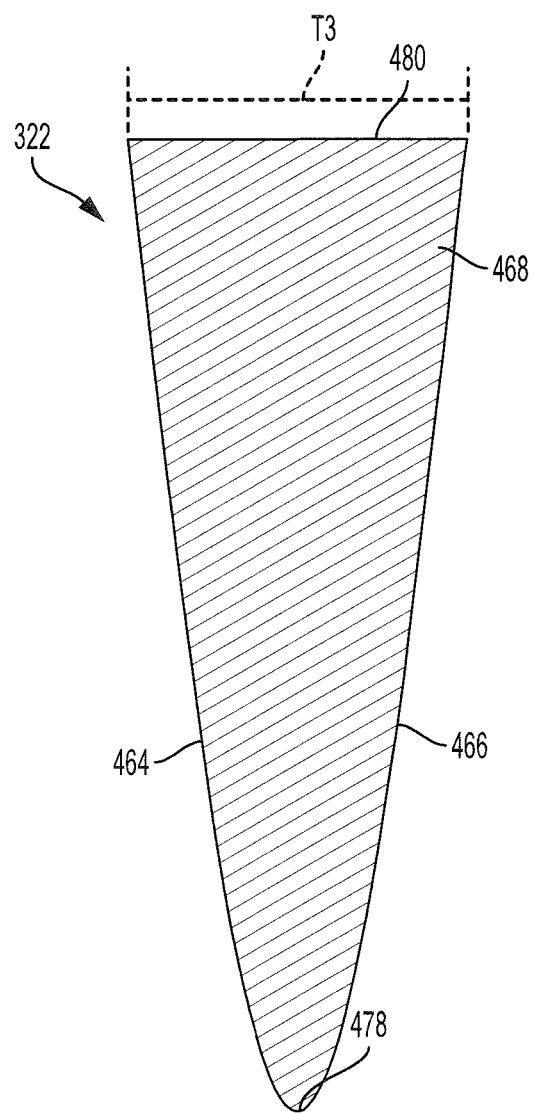
FIG. 27 is a diagrammatic representation of a cross-sectional view of a single output tooth, taken along plane 27-27 in FIG. 26.

FIG. 27 is a cross-sectional view of an exemplary engaging portion 468 of a single output tooth 322, taken along plane 27-27 in FIG. 26. One or both of the third engaging surface 464 and the fourth engaging surface 466 may be defined by a compound involute of a circle and an ellipse, as described in reference to FIG. 19.

The third engaging surface 464 and the fourth engaging surface 466 may meet smoothly at an apex 478 of each stator tooth. The curve of the third engaging surface may be a mirror image of the fourth engaging surface, reflected across a plane that is vertical in the view of FIG. 27, perpendicular to the plane of FIG. 27, and passes through apex 478.

A connecting surface 480 may connect the engaging portion 468 of the output tooth 322 to the supporting base of the output tooth, the supporting base best seen in FIG. 25. A thickness T3 of connecting surface 480, as measured in a direction around the rotation axis, may grow linearly with radial distance from the rotation axis.

Figure 28:
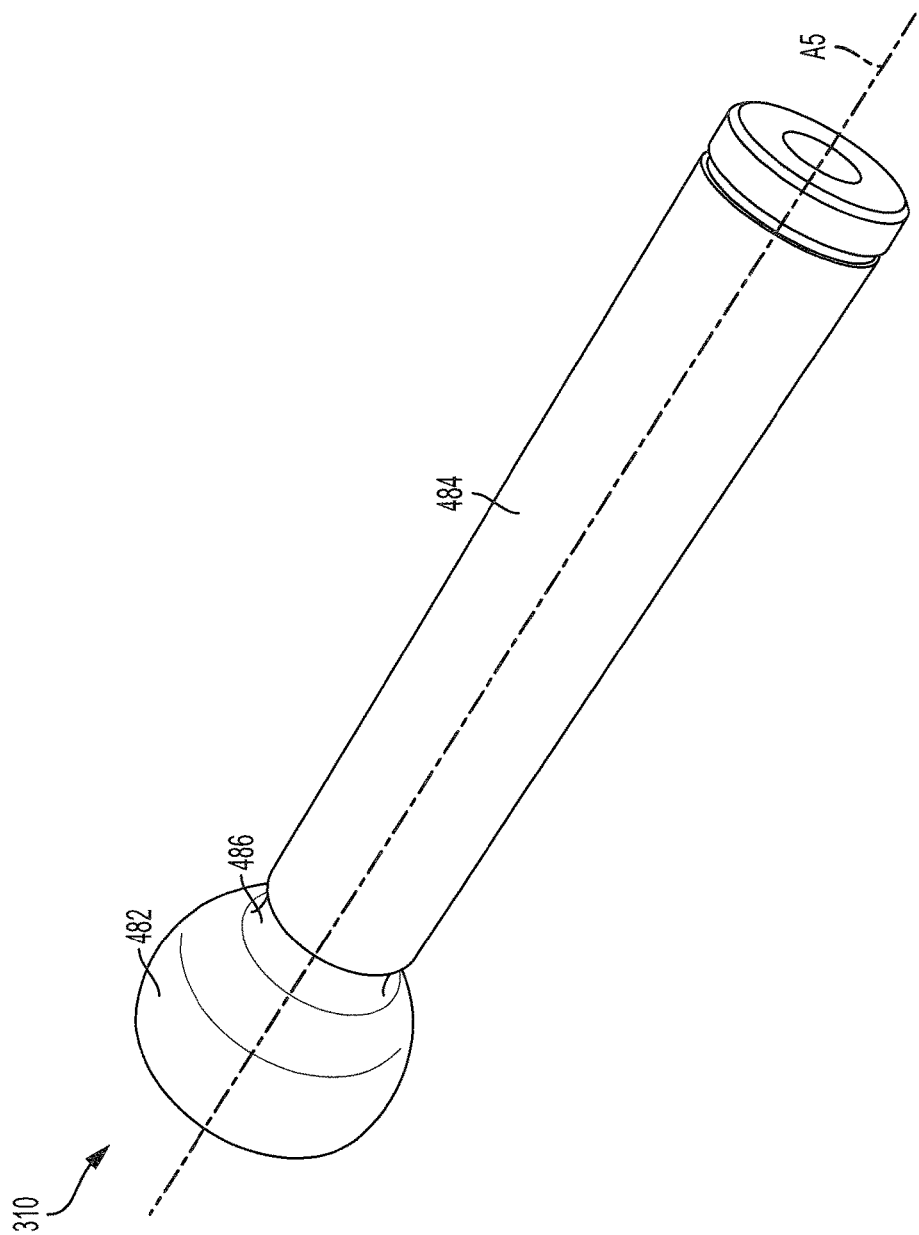
FIG. 28 is a diagrammatic representation of an isometric front view of a shaft the gearbox system of FIG. 4, showing a plurality of output teeth.

FIG. 28 is a front isometric view of support shaft 310. Support shaft 310 may be aligned with rotation axis A5. Support shaft 310 may include a ball portion 482, an arm portion 484, and a neck portion 486 disposed between the ball portion and the arm portion.

Figure 29:
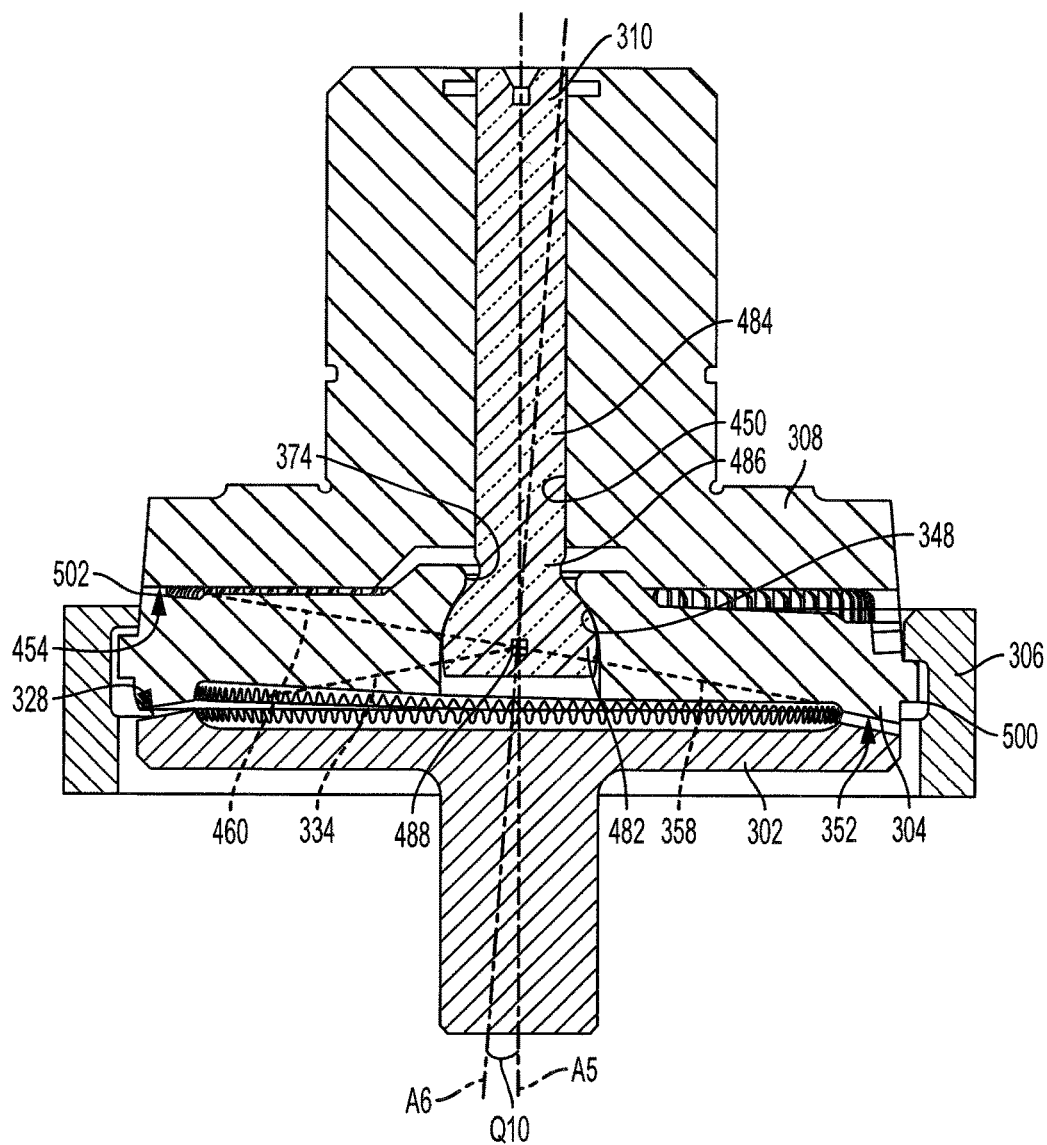
FIG. 29 is a diagrammatic representation of a cross-sectional view of the gearbox system of FIG. 4.

The ball portion 482 of the support shaft 310 may be configured to be received within the socket 348 of the wobble plate 304, see FIG. 12 and FIG. 29. The neck portion 486 of the support shaft may be configured to be received within the support shaft aperture 374 of the wobble plate 304, see FIG. 16 and FIG. 29. The arm portion 484 of the support shaft may be configured to be received within the support shaft aperture 450 of the output plate 308, see FIG. 24 and FIG. 29.

FIG. 29 is a cross-sectional view of gearbox system 300, showing input plate 302, wobble plate 304, stator gear 306, output plate 308, and support shaft 310 in an assembled configuration. The input plate, stator, output plate, and support shaft may be aligned along rotation axis A5. The wobble plate may be aligned wobble axis A6, which may be disposed at a non-zero angle Q10 relative to the rotation axis.

The annular input surface 328 of the input plate may contain a frustoconical line 334 that can be extended through a center of mass 488 of the wobble plate 304. Annular wobble surface 352 may contain a frustoconical line 358 that can be extended through the center of mass of the wobble plate. Annular output surface 454 may contain a frustoconical line 460 that can be extended through the center of mass of the wobble plate.

As the wobble plate 304 nutates around the stator 306, the input plate 302, and the output plate 308, the center of mass 488 of the wobble plate may be substantially stationary.

Wobble plate 304 may have a 0-degree position or point 500 which may be the position or point on the wobble plate which is farthest from the output plate, as measured in a direction parallel to the rotation axis A5. At the 0-degree position, the wobble plate 304 may be closest to the input plate 302. Wobble plate 304 may have a 90-degree position or point which may be one-fourth of the way around the wobble plate from the 0-degree position in a first nutation direction. For example, as viewed from a vantage point above the wobble plate near the output plate, the 90-degree position may be ninety degrees around a perimeter of the wobble plate in a counter-clockwise direction. Continuing around the perimeter of the wobble plate, a 180-degree position 502 or point may be located on the opposite side of the wobble plate as the 0-degree position 500. The 180-degree position may mark the closest approach of the wobble plate to the output plate and the point of farthest distance from the input plate. A 270-degree position or point may be located on the opposite side of the wobble plate as the 90-degree position.

Wobble plate 304 may nutate and rotate. Wobble plate 304 may be described as configured to nutate around the stator, around the input plate, around the output plate, and/or around a portion of the support shaft 310. In the case where the wobble plate is nutating in a first nutation direction, the 0-degree position of the wobble plate may move toward a current location of the 90-degree position so that, after one quarter of a full nutation, the 90-degree position has become the 0-degree position, the 180-degree position has become the 90-degree position, etc. As will be appreciated, the wobble plate may not rotate at the same rate as it nutates. That is, as the wobble plate completes a single full nutation, the 0-degree position may travel the full perimeter of the wobble plate. During this same time the wobble plate may rotate less than one full rotation.

Figure 30:
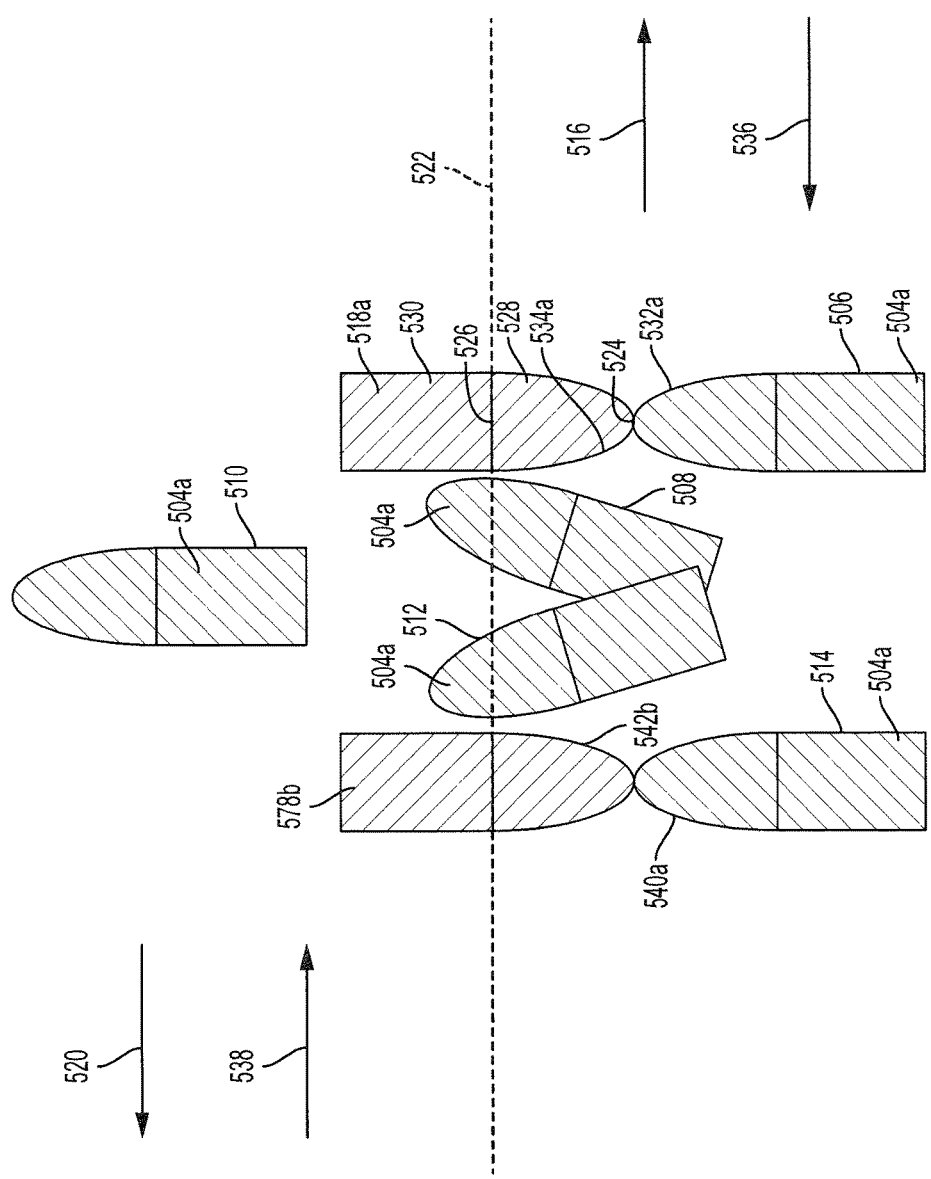
FIG. 30 is a diagrammatic representation of a single tooth of a first subset of elliptical teeth and two teeth of a second subset of elliptical teeth, showing the single tooth at five positions over the course of one full nutation of the wobble plate.

FIG. 30 is a schematic of a single wobble tooth 504a at five successive positions, 506, 508, 510, 512, and 514 over the course of one full nutation of the wobble plate in a first nutation direction 516, as viewed from a vantage point exterior to the gearbox system. Wobble tooth 504a may be of the first plurality of wobble teeth or the second plurality of wobble teeth. That is, wobble tooth 504a may be configured to interact and engage with the plurality of stator teeth or the plurality of output teeth. As the interactions between the first plurality of wobble teeth with the stator teeth and the second plurality of wobble teeth with the output teeth may be substantially similar, the interaction will be described once in reference to FIG. 30 and a pair of reaction teeth 518a and 518b can be taken to be either a pair of adjacent stator teeth or a pair of adjacent output teeth.

As the wobble plate nutates in the first nutation direction 516, the 0-degree position of the wobble plate may move in direction 516. As the wobble plate nutates in the first nutation direction, the wobble plate may rotate in a first rotation direction 520 with respect to the reaction teeth 518.

Wobble tooth 504a may take a first position 506 at a first time when tooth 504a is proximate the 0-degree position of the wobble plate. Wobble tooth 504a may take a second position 508 at a second time when tooth 504a is proximate the 270-degree position of the wobble plate. Wobble tooth 504a may take a third position 510 at a third time when the wobble tooth 504a is proximate the 180-degree position of the wobble plate. Wobble tooth 504a may take a fourth position 512 at a fourth time when tooth 504a is proximate the 90-degree position of the wobble plate. Wobble tooth 504a may take a fifth position 514 at a fifth time when tooth 504a is proximate the 0-degree position of the wobble plate. Between the first time and the fifth time the wobble plate may complete one full nutation. Note that the angle of wobble tooth 504a when in positions 508 and 512 may be exaggerated for the purpose of distinguishing between the five positions.

Reaction teeth 518a and 518b may define a plane, seen in cross section at 522 in FIG. 25. In the case where reaction teeth 518a and 518b represent a pair of adjacent stator teeth, the plane may be defined by the plurality of stator teeth. Plane 522 may be perpendicular to the rotation axis and may intersect each of the reaction teeth at a common location. For example, plane 522 may intersect each reaction tooth at any common point such as an apex 524 or a connecting surface 526 between an engaging portion 528 of a reaction tooth and a supporting base 530 of a reaction tooth.

First position 506 and fifth position 514 may be located below the reaction teeth 518a and 518b and plane 522. Third position 510 may be located above the reaction teeth and plane 522. During a single nutation of the wobble plate, wobble tooth 504a may move from the first position 506 below the reaction teeth, through plane 522 defined by the reaction teeth, to the third position 510 above the reaction teeth, back through plane 522 defined by the reaction teeth, and to the fifth position 514 below the reaction teeth. Herein above and below may be relative to plane 522 and along the rotation axis.

As the wobble tooth 504a moves between the first position 506 and the second position 508, the first engaging surface 532a of wobble tooth 504a may engage with the third engaging surface 534a of reaction tooth 518a. This engagement may be in the form of a rolling contact, where the first engaging surface rolls along the third engaging surface. This rolling contact may be in contrast to many standard gear interfaces where opposing faces of gear teeth interact via a sliding contact. In general, assuming the same two surfaces are involved, rolling contact has much less friction than sliding contact between the two surfaces.

Wobble tooth 504a may engage with the reaction teeth along one-fourth of either the stator gear or the output plate at any moment as the wobble plate nutates in the first nutation direction 516. That is, wobble tooth 504a may engage with reaction tooth 518a when the wobble tooth is in the fourth of the nutation between the 0-degree position and the 270-degree position, between positions 506 and 508, but not when the wobble tooth is in the three-fourths of the nutation between the 270-degree position and the 0-degree position, between positions 508 and 514. Wobble tooth 504a need not engage with reaction tooth 518 at every location between the 0-degree position and the 270-degree position, for example a single wobble tooth may engage with a reaction tooth for approximately 20% of a single nutation. When wobble tooth 504a reaches position 514 it may engage with reaction tooth 518b and begin a second nutation.

The wobble tooth may only make contact with the reaction teeth between the 0-degree position and the 270-degree position when nutating in the first nutation direction, and this contact may be limited to rolling contact between subsets of the pluralities of wobble and either the stator teeth or output teeth. Thus, the wobble plate may nutate around the stator with less friction than in the case of a sliding contact. Such a configuration may lead to an efficient transfer of nutational motion or energy to rotational motion or energy.

As each of the wobble teeth, stator teeth, and output teeth may be wedge shaped, contact forces between reaction tooth 518a and wobble tooth 504a may be exerted at a point of contact between the teeth and the contact forces may be substantially perpendicular to a line parallel to the rotation axis and a radial line extending from the point of contact to the rotation axis. The engagement of reaction tooth 518a and wobble tooth 504a may occur along a line of contact, perpendicular to the schematic view of FIG. 30, the line of contact extending through a center of mass of the wobble plate.

When the wobble plate is nutating in a second nutation direction 536, each tooth in the first plurality of wobble teeth and the second plurality of wobble teeth may rotate in a second rotation direction 538. Regarding FIG. 30, a single wobble tooth 504a may successively take positions 514, 512, 510, 508, and 506 in the opposite order than when the wobble plate nutates in the first nutation direction. That is, wobble tooth 504a may first make contact with a reaction tooth at the fifth position 514. Wobble tooth 504a may then make rolling contact with reaction tooth 518b along the second engaging surface 540a of wobble tooth 504a and the fourth engaging surface 542b of reaction tooth 518b between the fifth position 514 and the fourth position 512. Wobble tooth 504a may then make little to no contact with the reaction teeth as it moves from the fourth position 512 to the third position 510, the second position 508 and the first position 506. Once reaching first position 506, the wobble tooth 504a may then make contact with reaction tooth 518a as a subsequent nutation begins.

Figure 31:
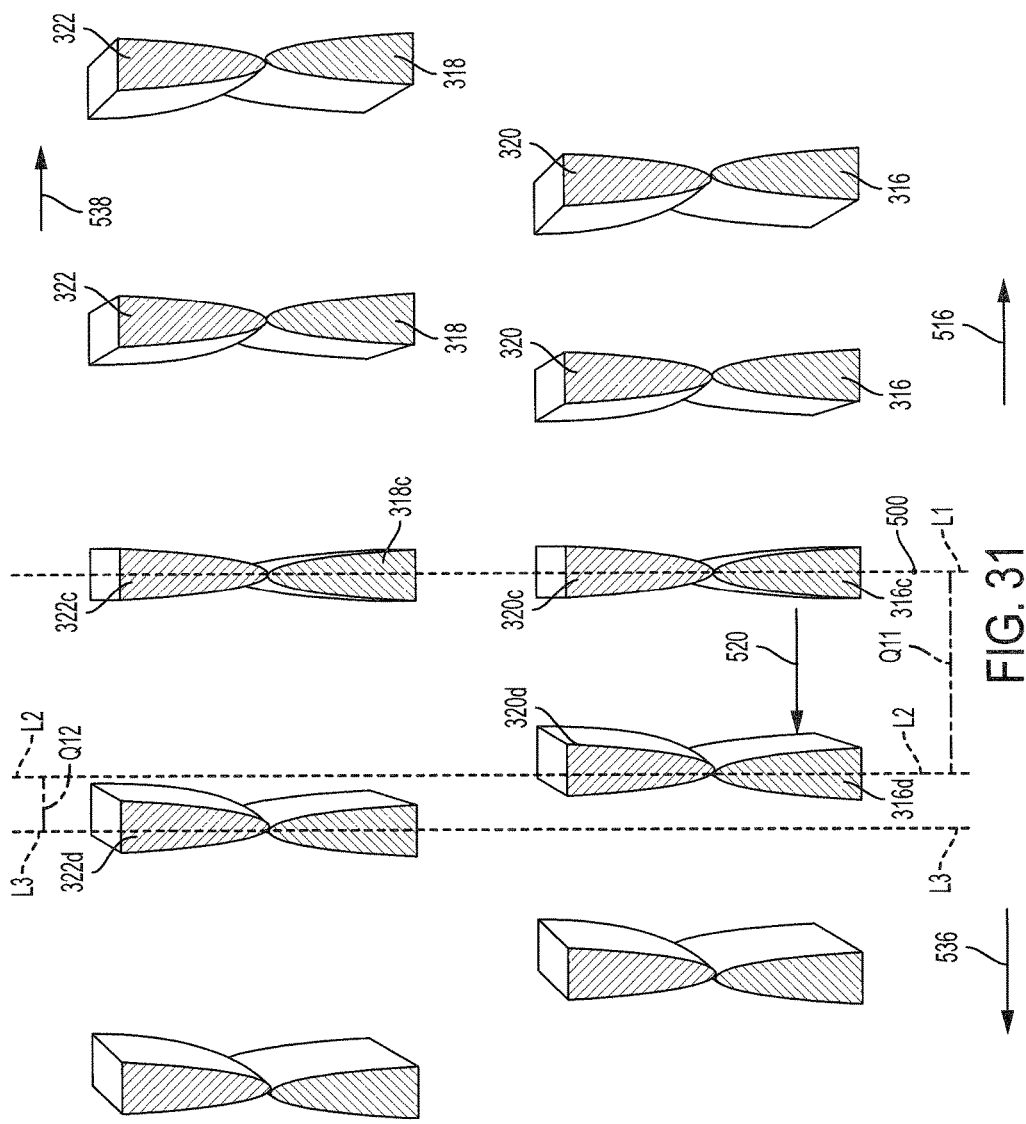
FIG. 31 is a diagrammatic representation of a subset of the first plurality of wobble teeth, a subset of the plurality of stator teeth, a subset of the second plurality of wobble teeth, and a subset of the plurality of output teeth proximate a 0-degree position of the wobble plate.

FIG. 31 is a zoomed in schematic view showing a subset of the first plurality of wobble teeth 316, a subset of the stator teeth 320, a subset of the second plurality of wobble teeth 318, and a subset of the plurality of output teeth 322. In the view of FIG. 31, the first plurality of wobble teeth and the second plurality of wobble teeth have been spaced from each other for purposes of illustrating the disposition of the first plurality of wobble teeth and the second plurality of wobble teeth relative to the stator teeth and the output teeth. The schematic view of FIG. 31 may be taken to be proximate the 0-degree position 500 of the wobble plate, and may be taken to indicate a time marking the beginning of a first nutation in the first nutation direction 516.

At the beginning of the first nutation, the first plurality of wobble teeth may be just engaging with the plurality of stator teeth proximate the 0-degree position 500. Referring now to specific teeth in FIG. 31, a wobble tooth 316c of the first plurality may first make contact with a stator tooth 320c when the wobble tooth 316c is proximate the down position. The wobble tooth 316c and the stator tooth may subsequently engage in a rolling contact as the wobble plate nutates around the stator in the first nutation direction, as described in reference to FIG. 30.

As the wobble plate nutates, the stator teeth 320 may remain stationary within the context of the gearbox system and in the view of FIG. 31. In the exemplary embodiment, where the first plurality of wobble teeth 316 has ninety wobble teeth and the plurality of stator teeth 320 has ninety-one stator teeth, at the end of the first nutation, wobble tooth 316c may occupy the same location as did adjacent wobble tooth 316d at the beginning of the first nutation. That is, the wobble plate may have rotated $1/91^{st}$ of a complete rotation, as indicated by the angular displacement Q11 between reference line L1 marking the location of stator tooth 320c and reference line L2 marking the location of adjacent stator tooth 320d.

Since there may be one less of the wobble teeth in the first plurality than stator teeth, the wobble plate may move left, i.e. in the first rotation direction 520, as the wobble plate nutates to the right, i.e. in the first nutation direction 516, with respect to the stator gear. Similarly, as the second plurality of wobble teeth 318 may include eighty-five wobble teeth and the plurality of output teeth may include eighty-six wobble teeth, the wobble plate may move left with respect to the output plate as the wobble plate nutates to the right around the output plate.

Thus, if at the onset of the first nutation, wobble tooth 318c of the second plurality of wobble teeth is commencing engagement with output tooth 322c, then at the conclusion of the first nutation, wobble tooth 318c may be commencing engagement with adjacent output tooth 322d. Since the first plurality of wobble teeth and the second plurality of wobble may both be fixed to the wobble plate, a rigid object, the rotation accomplished during a single nutation may be the same for the first plurality of wobble teeth and the second plurality of wobble teeth. That is, after the first nutation if wobble tooth 316c has moved to the left by an amount equal to angular displacement Q11, then wobble tooth 318c may have also moved to the left by angular displacement Q11 to a location marked in FIG. 31 by reference line L2.

As wobble tooth 318c may be commencing engagement with output tooth 322d at the end of the first nutation, the output plate may have rotated to the right by angular displacement Q12 during the first nutation. Angular displacement Q12 may mark the angular displacement of output tooth 322d during the first nutation of the wobble plate, as measured between a reference line L3 marking the location of output tooth 322d at the beginning of the first nutation and reference line L2. The angular spacing between adjacent output teeth may be $1/86^{th}$ of a full rotation, as marked between reference line L1 and reference line L3. Hence the angular displacement Q12 of the output plate during a single nutation may be (1/86-1/91), or approximately 0.064%, of a full rotation.

In this case it may take 1565 complete nutations of the wobble plate for the output plate to rotate once. As the input plate may have the same number of input teeth as the wobble plate has face teeth, the input plate may rotate at the same rate as the input plate. Thus, 1565 rotations of the input plate may correspond to one rotation of the output plate, for a total gear ratio of the gearbox system of 1565:1.

As each of the plurality of input teeth, the plurality of face teeth, the first plurality of wobble teeth, the plurality of stator teeth, the second plurality of wobble teeth, and the plurality of output teeth may be symmetric, the above description may apply when the wobble plate is nutating in the second nutation direction 536 and the output plate is rotating in the second rotation direction 538.

Many of the surfaces in the various embodiments described herein have precisely designed curved surfaces that interact with other surfaces on other parts of the described embodiments. Accordingly, when terms such as "planar," "perpendicular," or "aligned" are used, it is to be understood that these terms may be approximations within whatever manufacturing or use tolerances exist for the various embodiments. For example, a surface said to be "parallel" to an axis may be substantially parallel or approximately parallel to the axis, where any deviations from exactly parallel are due to real-world constraints of creating physical devices and these deviations may be small enough so as to not hinder the described function of the embodiments.

Example 5

Figure 32:
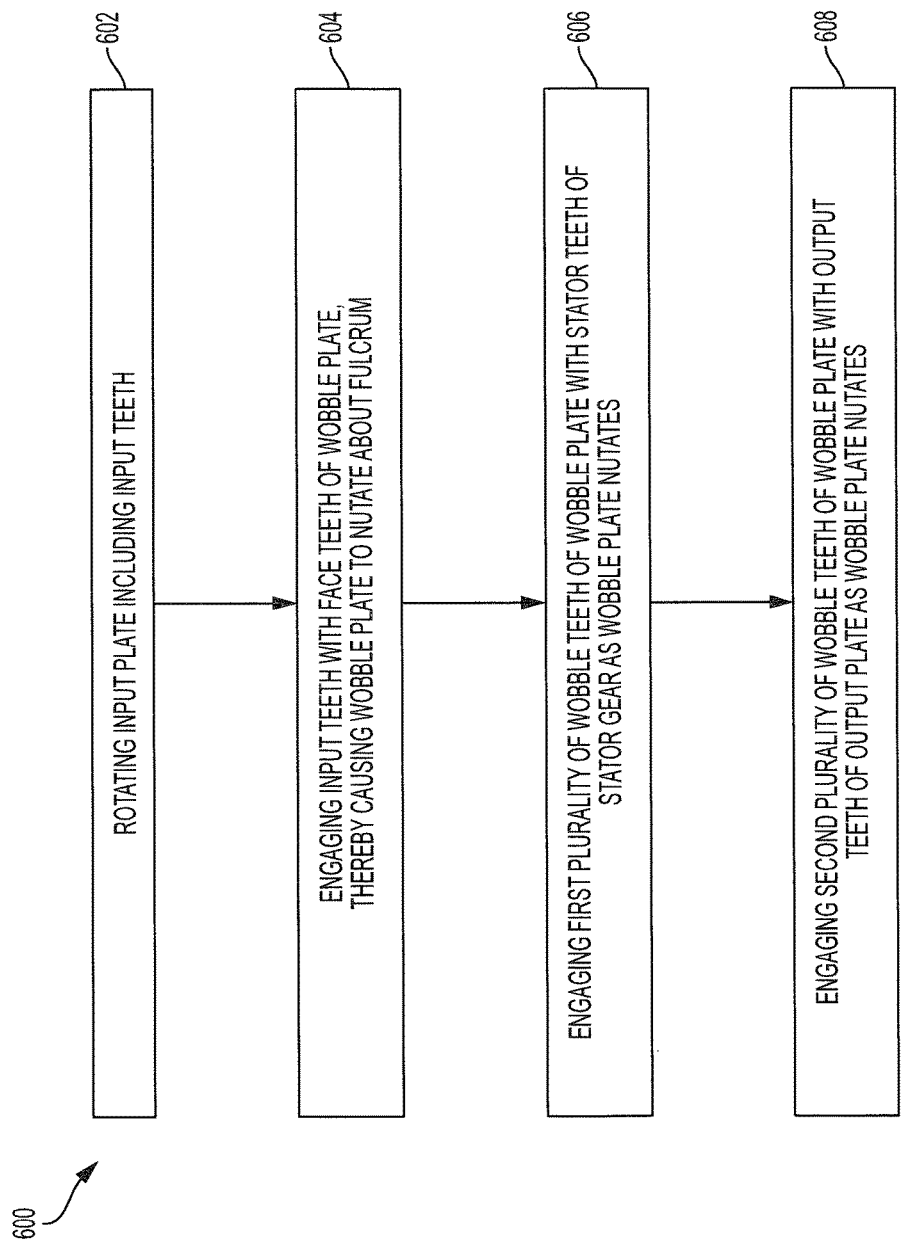
FIG. 32 is a diagrammatic representation of a flow chart illustrating a method for operating an elliptically interfacing gearbox mechanism.

This example describes an illustrative method for operating an elliptically interfacing gearbox mechanism, which may be used in conjunction with any of the apparatuses or systems described herein; see FIG. 32.

FIG. 32 describes multiple steps of a method, general indicated at 600, for operating an elliptically interfacing gearbox system. Method 600 may be used in conjunction with any of the gearboxes or gearbox systems described in reference to FIGS. 1-31. Although various steps of method 600 are described below and depicted in FIG. 32, the steps need not necessarily all be performed, in some cases may be performed in a different order than the order shown, and in some cases may be performed simultaneously.

Method 600 may include a step 602 of rotating an input plate including a plurality of input teeth. Rotating the input plate may include coupling the input plate to an input shaft and rotating the input shaft. The plurality of input teeth may be disposed on an annular input surface or other face of the input plate.

Method 600 may include a step 604 of engaging the plurality of input teeth with a plurality of face teeth of a wobble plate, thereby causing the wobble plate to nutate about a fulcrum. Engaging the plurality of input teeth with the plurality of face teeth may cause the wobble plate to rotate as the input plate rotates. The wobble plate may rotate according to a first gear ratio between the input plate and the wobble plate. The first gear ratio may be 1:1, though there are many other possibilities. The wobble plate may nutate as it rotates. The wobble plate may nutate about a fulcrum, for example, the ball portion 482 of the support shaft 310 may serve as a fulcrum about which the wobble plate may nutate, see FIGS. 28 and 29.

Method 600 may include a step 606 of engaging a first plurality of wobble teeth of the wobble plate with a plurality of stator teeth of a stator gear as the wobble plate nutates. Each tooth of the first plurality of wobble teeth and the plurality of stator teeth may have a face defined by a compound involute of a circle and an ellipse. The engagement of the first plurality of wobble teeth with the plurality of stator teeth may be a rolling contact between the teeth along the faces defined by a compound involute of a circle and an ellipse.

A pair of adjacent stator teeth may define a tooth pitch as an angular spacing between corresponding locations on each tooth of the pair of adjacent stator teeth. For example, the tooth pitch may be the sum of the angular spacings Q6 and Q7 shown in FIG. 22. Each stator tooth may have a cross-sectional shape having an angular width that is less than one half of the tooth pitch. Such spacing between adjacent stator teeth may provide clearance for wobble teeth of the first plurality of wobble teeth to move above, below, and through a plane defined by the plurality of stator teeth as the wobble plate nutates.

Each stator tooth of the plurality of stator teeth may have a stator tooth apex, and the apexes of the plurality of stator teeth may define a stator plane. During a single nutation of the wobble plate, at least a portion of one of the plurality of wobble teeth may be configured to move from a first position below the stator plane, through the stator plane to a second position above the stator plane, and back through the stator plane to a third position below the stator plane, see FIG. 30.

Method 600 may include a step 608 of engaging a second plurality of wobble teeth of the wobble plate with a plurality of output teeth of an output plate as the wobble plate nutates. Each tooth of the second plurality of wobble teeth and the plurality of output teeth may have a face defined by a compound involute of a circle and an ellipse. The engagement of the second plurality of wobble teeth with the plurality of output teeth may be a rolling contact between the teeth along the faces defined by a compound involute of a circle and an ellipse.

Engaging the second plurality of wobble teeth of the wobble plate with the plurality of output teeth of the output plate may cause the output plate to rotate. A rotational rate of the input plate may be different from a rotational rate of the output plate. The output plate may rotate according to a total gear ratio between the input plate and the output plate. The total gear ratio may be as high as 1000:1 or higher.

All of steps 602, 604, 606, and 608 may happen simultaneously. That is, rotating the input plate may cause rotation of the wobble plate, engagement between the input teeth and the face teeth, engagement of the first plurality of wobble teeth with the stator teeth, nutation of the wobble plate, engagement of the second plurality of wobble teeth with the output teeth, and rotation of the output plate.

The stator gear may define a stator plane, the input plate may be configured to be parallel to the stator plane, the output plate may be configured to be parallel to the stator plane, and the wobble plate may configured to be inclined at an angle with respect to the stator plane and disposed between the input plate and the output plate, see for example in FIG. 29.

Example 6

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. An elliptically interfacing gearbox system, comprising:

an input plate having a rotation axis and a plurality of input teeth;

a wobble plate having a wobble axis disposed at a non-zero angle relative to the rotation axis, a rear face, a plurality of face teeth disposed on the rear face, a first plurality of wobble teeth disposed in a first plane perpendicular to the wobble axis, and a second plurality of wobble teeth disposed in a second plane perpendicular to the wobble axis, the second plane spaced from the first plane along the wobble axis;

a stator gear having a plurality of stator teeth;

an output plate having an output axis substantially aligned with the rotation axis and a plurality of output teeth;

wherein the plurality of input teeth are configured to engage with the plurality of face teeth, the first plurality of wobble teeth are configured to engage with the plurality of stator teeth, and the second plurality of wobble teeth are configured to engage with the plurality of output teeth as the wobble plate nutates around the stator gear.

A2. The elliptically interfacing gearbox system of paragraph A1, wherein each tooth of the first plurality of wobble teeth is configured to engage a tooth of the plurality of stator teeth via rolling contact as the wobble plate nutates around the stator gear.

A3. The elliptically interfacing gearbox system of paragraph A1, wherein each tooth of the second plurality of wobble teeth is configured to engage a tooth of the plurality of output teeth via rolling contact as the wobble plate nutates around the stator gear.

A4. The elliptically interfacing gearbox system of paragraph A1, wherein the first plurality of wobble teeth engage with the plurality of stator teeth along one-fourth of the stator gear at any moment as the wobble plate nutates around the stator gear.

A5. The elliptically interfacing gearbox system of paragraph A1, wherein the second plurality of wobble teeth engage with the plurality of output teeth along one-fourth of the output plate at any moment as the wobble plate nutates around the stator gear.

A6. The elliptically interfacing gearbox system of paragraph A1, wherein each tooth of the first plurality of wobble teeth and the second plurality of wobble teeth has a wobble-tooth cross-sectional shape, each tooth of the plurality of stator teeth has a stator tooth cross-sectional shape, each tooth of the plurality of output teeth has an output tooth cross-sectional shape, and each wobble tooth cross-sectional shape, each stator tooth cross-sectional shape, and each output tooth cross-sectional shape is at least partially defined by a compound involute of a circle and an ellipse.

A7. The elliptically interfacing gearbox system of paragraph A1, wherein the wobble plate is configured so that contact forces exerted on the wobble plate by any of the input plate, the stator, or the output plate will point in directions that are tangent to circles which lie in planes perpendicular to the rotation axis.

A8. The elliptically interfacing gearbox system of paragraph A1, wherein each of the first plurality of wobble teeth has an angular width, as measured in an angular direction around the wobble axis, that is less than one half of an angular spacing between adjacent stator teeth of the plurality of stator teeth, as measured in an angular direction around the rotation axis.

A9. The elliptically interfacing gearbox system of paragraph A1, wherein each of the second plurality of wobble teeth has an angular width, as measured in an angular direction around the wobble axis, that is less than one half of an angular spacing between adjacent output teeth of the plurality of output teeth, as measured in an angular direction around the rotation axis.

A10. The elliptically interfacing gearbox system of paragraph A1, wherein during a single nutation of the wobble plate, at least one of the first plurality of wobble teeth is configured to move from a first position below the plurality of stator teeth, through a plane defined by the plurality of stator teeth, to a second position above the plane defined by the plurality of stator teeth, back through the plane defined by the plurality of stator teeth, and to a third position below the plurality of stator teeth, where below and above are defined relative to the plane defined by the plurality of stator teeth.

A11. The elliptically interfacing gearbox system of paragraph A1, wherein the wobble plate is configured to:

a) rotate, according to a first gear ratio between the input plate and the wobble plate, in response to a rotation of the input plate, b) nutate, according to a second gear ratio between the wobble plate and the stator gear, in response to the rotation of the wobble plate, and c) drive a rotation of the output plate, according to a third gear ratio between the wobble plate and the output plate, in response to the nutation of the wobble plate.

A12. The elliptically interfacing gearbox system of paragraph A11, wherein a total gear ratio of the elliptically interfacing gearbox system, which depends upon the first gear ratio, the second gear ratio, and the third gear ratio, is at least 1000:1.

A13. The elliptically interfacing gearbox system of paragraph A1, wherein the input plate is a first input plate, the rotation axis is a first rotation axis, the wobble plate is a first wobble plate, the stator gear is a first stator gear, and the output plate is a first output plate, further comprising:

a second input plate configured to rotate with the first output plate, the second input plate configured to rotate about a second rotation axis;

a second wobble plate having a second wobble axis disposed at a non-zero angle relative to the second rotation axis;

a second stator gear; and a second output plate;

wherein the second wobble plate is configured to engage with the second input plate and rotate in response to a rotation of the second input plate, engage with the second stator gear and nutate in response to the rotation of the second wobble plate, engage with the second output plate and drive a rotation of the second output plate in response to the nutation of the second wobble plate.

A14. The elliptically interfacing gearbox system of paragraph A1, wherein the input plate is a first input plate, the rotation axis is a first rotation axis, the wobble plate is a first wobble plate, the stator gear is a first stator gear, and the output plate is a first output plate, further comprising:

a second wobble plate having a second wobble axis disposed at a non-zero angle relative to the second rotation axis;

a second stator gear; and a second output plate;

wherein the second wobble plate is configured to engage with the first output plate and rotate in response to a rotation of the first output plate, engage with the second stator gear and nutate in response to the rotation of the second wobble plate, engage with the second output plate and drive a rotation of the second output plate in response to the nutation of the second wobble plate.

B1. A wobble plate for use in an elliptically interfacing gearbox system, the wobble plate comprising:

a wobble axis;

a first plurality of wobble teeth disposed in a first plane perpendicular to the wobble axis;

a second plurality of wobble teeth disposed in a second plane perpendicular to the wobble axis, the second plane spaced along the wobble axis from the first plane; and a plurality of face teeth disposed in a third plane perpendicular to the wobble axis, the third plane spaced along the wobble axis from the first plane and the second plane;

wherein at least one of the first plurality of wobble teeth and the second plurality of wobble teeth has a cross-sectional shape at least partially defined by a compound involute of a circle and an ellipse.

B2. The wobble plate of paragraph B1, wherein the wobble plate is configured so that contact forces exerted on the wobble plate by another gear or plate in the elliptically interfacing gearbox system will point in directions that are substantially perpendicular to a line parallel to the wobble axis and radial lines extending from points of contact to the wobble axis.

B3. The wobble plate of paragraph B1, wherein each tooth of the first plurality of wobble teeth has an angular width that is less than one half of an angular spacing between adjacent teeth of the first plurality of wobble teeth, as measured in an angular direction around the wobble axis.

B4. The wobble plate of paragraph B3, wherein each tooth of the second plurality of wobble teeth has an angular width that is less than one half of an angular spacing between adjacent teeth of the second plurality of wobble teeth, as measured in an angular direction around the wobble axis.

B5. The wobble plate of paragraph B1, wherein each tooth of the first plurality of wobble teeth has two engaging surfaces with each of the two engaging surfaces defined by a compound involute of a circle and an ellipse, the two engaging surfaces defining opposite sides of the tooth.

B6. The wobble plate of paragraph B5, wherein each tooth of the second plurality of wobble teeth has two engaging surfaces with each of the two engaging surfaces defined by a compound involute of a circle and an ellipse, the two engaging surfaces defining opposite sides of the tooth.

B7. The wobble plate of paragraph B1, wherein the plurality of face teeth are disposed on a frustoconical surface of the wobble plate, the frustoconical surface configured so that a center of mass of the wobble plate is a vertex of the frustoconical surface.

C1. A method for operating an elliptically interfacing gearbox mechanism, comprising:
rotating an input plate including a plurality of input teeth;
engaging the plurality of input teeth with a plurality of face teeth of a wobble plate, thereby causing the wobble plate to nutate about a fulcrum;
engaging a first plurality of wobble teeth of the wobble plate with a plurality of stator teeth of a stator gear as the wobble plate nutates;
engaging a second plurality of wobble teeth of the wobble plate with a plurality of output teeth of an output plate as the wobble plate nutates.

C2. The method of paragraph C1, wherein each tooth of the first plurality of wobble teeth, the second plurality of wobble teeth, the plurality of stator teeth, and the plurality of output teeth has a face defined by a compound involute of a circle and an ellipse.

C3. The method of paragraph C1, wherein a pair of adjacent stator teeth define a tooth pitch as an angular spacing between corresponding locations on each tooth of the pair of adjacent stator teeth, and each stator has a cross-sectional shape having an angular width that is less than one half of the tooth pitch.

C4. The method of paragraph C1, wherein the stator gear defines a stator plane, the input plate is configured to be parallel to the stator plane, the output plate is configured to be parallel to the stator plane, and the wobble plate is configured to be inclined at an angle with respect to the stator plane and disposed between the input plate and the output plate.

C5. The method of paragraph C1, wherein each stator tooth of the plurality of stator teeth has a stator tooth apex, and the apexes of the plurality of stator teeth define a stator plane, and during a single nutation of the wobble plate, at least a portion of one of the plurality of wobble teeth is configured to move from a first position below the stator plane, through the stator plane to a second position above the stator plane, and back through the stator plane to a third position below the stator plane.

C6. The method of paragraph C1, wherein rotating the input plate includes coupling the input plate to an input shaft and rotating the input shaft.

C7. The method of paragraph C1, wherein engaging the second plurality of wobble teeth of the wobble plate with the plurality of output teeth of the output plate causes the output plate to rotate and wherein a rotational rate of the input plate is different than a rotational rate of the output plate.

D1. A gearbox system comprising:
an input plate, a wobble plate, a stator, and an output plate;
wherein the wobble plate is configured to:
a) engage with the input plate and rotate, according to a first gear ratio between the input plate and the wobble plate, in response to a rotation of the input plate,
b) engage with the stator and nutate, according to a second gear ratio between the wobble plate and the stator, in response to the rotation of the wobble plate, and
c) engage with the output plate and drive a rotation of the output plate, according to a third gear ratio between the wobble plate and the output plate, in response to the nutation of the wobble plate.

D2. The gearbox system of paragraph D1, wherein a total gear ratio of the gearbox, which depends upon the first, second, and third gear ratios, is at least 1000:1.

D3. The gearbox system of paragraph D2, wherein the wobble plate includes a first plurality of wobble teeth and a second plurality of wobble teeth, the stator includes a plurality of stator teeth, and the wobble plate is configured to engage with the stator via a rolling contact between the first plurality of wobble teeth and the plurality of stator teeth.

D4. The gearbox system of paragraph D3, wherein the output plate includes a plurality of output teeth and the wobble plate is configured to engage with the output plate via a rolling contact between the second plurality of wobble teeth and the plurality of output teeth.

D5. The gearbox system of paragraph D4, wherein the gearbox system is configured to operate at an efficiency of greater than 80%.

D6. The gearbox system of paragraph D5, wherein each of the first plurality of wobble teeth, the second plurality of wobble teeth, the plurality of stator teeth, and the plurality of output teeth have a cross-sectional shape that is at least partially defined by a compound involute of a circle and an ellipse.

E1. A gearbox system comprising:
a stator, an input plate, a wobble plate, and an output plate;
wherein the wobble plate is configured to engage with the input plate, the stator and the output plate, further configured to nutate and rotate in response to a rotation of the input plate, and the output plate is configured to rotate in response to the rotation of the wobble plate; and wherein a ratio of the rotation of the input plate to the rotation of the output plate is at least 1000:1.

F1. A gearbox system comprising:
a stator, an input plate, a wobble plate, and an output plate;
wherein the wobble plate is configured to engage with the input plate, the stator and the output plate, further configured to nutate and rotate in response to a rotation of the input plate, and the output plate is configured to rotate in response to the rotation of the wobble plate;
wherein a ratio of the rotation of the input plate to the rotation of the output plate is at least 1000:1; and
wherein the gearbox system is configured to operate at an efficiency greater than 80%.

G1. A wobble plate for use in an elliptically interfacing gearbox system, the wobble plate comprising:
a wobble axis;
a first plurality of wobble teeth disposed in a first ring having a first inner diameter;
a second plurality of wobble teeth disposed in a second ring having a second inner diameter, the second ring spaced along the wobble axis from the first ring, and the second inner diameter smaller than the first inner diameter; and
a plurality of face teeth disposed in a third plane perpendicular to the wobble axis, the third plane spaced along the wobble axis from the first plane and the second plane.

Advantages, Features, Benefits

The different embodiments of the gearbox systems described herein provide several advantages over known solutions for designing gearboxes with high gear ratios that also take up a small volume. According to the present disclosure gear ratios in the hundreds and even thousands are possible using only an input plate, a stator, a wobble plate, and an output plate. For example, the illustrative embodiments described herein allow for high-efficiency non-eccentric motion of a nutating wobble plate. No known system or device can perform these functions, particularly in such a small volume. Thus, the illustrative embodiments described herein are particularly useful for creating gearboxes with high gear ratios and high efficiency in a small volume with a small number of moving parts. However, not all embodiments described herein provide the same advantages or the same degree of advantage.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed disclosure. The subject matter of the disclosure(s) includes all novel and nonobvious combinations and subcombinations of the various elements, features, functions, and/or properties disclosed herein. The following claims particularly point out certain combinations and subcombinations regarded as novel and nonobvious. Disclosure(s) embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the disclosure(s) of the present disclosure.

We claim:

1. A gearbox system, comprising:
an input plate having a rotation axis and a plurality of input teeth;
a wobble plate having a wobble axis disposed at a non-zero angle relative to the rotation axis, a rear face, a plurality of face teeth disposed on the rear face, a first plurality of wobble teeth disposed in a first plane perpendicular to the wobble axis, and a second plurality of wobble teeth disposed in a second plane perpendicular to the wobble axis, the second plane spaced from the first plane along the wobble axis;
a stator gear having a plurality of stator teeth; and
an output plate having an output axis substantially aligned with the rotation axis and a plurality of output teeth;
wherein the plurality of input teeth are configured to engage with the plurality of face teeth, the first plurality of wobble teeth are configured to engage with the plurality of stator teeth, and the second plurality of wobble teeth are configured to engage with the plurality of output teeth as the wobble plate nutates around the stator gear.

2. The gearbox system of claim 1, wherein each tooth of the first plurality of wobble teeth is configured to engage a tooth of the plurality of stator teeth via rolling contact and each tooth of the second plurality of wobble teeth is configured to engage a tooth of the plurality of output teeth via rolling contact as the wobble plate nutates around the stator gear.

3. The gearbox system of claim 1, wherein the first plurality of wobble teeth engage with the plurality of stator teeth along one-fourth of the stator gear and the second plurality of wobble teeth engage with the plurality of output teeth along one-fourth of the output plate at any moment as the wobble plate nutates around the stator gear.

4. The gearbox system of claim 1, wherein each tooth of the first plurality of wobble teeth and the second plurality of wobble teeth has a wobble-tooth cross-sectional shape, each tooth of the plurality of stator teeth has a stator tooth cross-sectional shape, each tooth of the plurality of output teeth has an output tooth cross-sectional shape, and each wobble tooth cross-sectional shape, each stator tooth cross-sectional shape, and each output tooth cross-sectional shape is at least partially defined by a compound involute of a circle and an ellipse.

5. The gearbox system of claim 1, wherein the wobble plate is configured such that contact forces exerted on the wobble plate by any one of the input plate, the stator gear, and the output plate will point in directions that are tangent to circles which lie in planes perpendicular to the rotation axis.

6. The gearbox system of claim 1, wherein each of the first plurality of wobble teeth has an angular width, as measured in an angular direction around the wobble axis, that is less than one half of an angular spacing between adjacent stator teeth of the plurality of stator teeth, as measured in an angular direction around the rotation axis.

7. The gearbox system of claim 1, wherein the wobble plate is configured to:
a) rotate, according to a first gear ratio between the input plate and the wobble plate, in response to a rotation of the input plate,
b) nutate, according to a second gear ratio between the wobble plate and the stator gear, in response to the rotation of the wobble plate, and
c) drive a rotation of the output plate, according to a third gear ratio between the wobble plate and the output plate, in response to the nutation of the wobble plate.

8. The gearbox system of claim 7, wherein a total gear ratio of the elliptically interfacing gearbox system, which depends upon the first gear ratio, the second gear ratio, and the third gear ratio, is at least 1000:1.

9. The gearbox system of claim 1, wherein the input plate is a first input plate, the wobble plate is a first wobble plate, the stator gear is a first stator gear, and the output plate is a first output plate, further comprising:
a second wobble plate having a second wobble axis;
a second stator gear; and
a second output plate;
wherein the second wobble plate is configured to engage with the first output plate and rotate in response to a rotation of the first output plate, engage with the second stator gear and nutate in response to the rotation of the second wobble plate, and engage with the second output plate and drive a rotation of the second output plate in response to the nutation of the second wobble plate.

10. The gearbox system of claim 1, wherein at least one of the first plurality of wobble teeth and the second plurality of wobble teeth has a cross-sectional shape at least partially defined by a compound involute of a circle and an ellipse.

11. The gearbox system of claim 10, wherein the wobble plate is configured such that contact forces exerted on the wobble plate by another gear or plate in the gearbox system will point in directions that are substantially perpendicular to a line parallel to the wobble axis and radial lines extending from points of contact to the wobble axis.

12. The gearbox system of claim 10, wherein each tooth of the second plurality of wobble teeth has an angular width that is less than one half of an angular spacing between adjacent teeth of the second plurality of wobble teeth, as measured in an angular direction around the wobble axis.

13. The gearbox system of claim 10, wherein each tooth of the first plurality of wobble teeth and the second plurality of wobble teeth has two engaging surfaces with each of the two engaging surfaces defined by a compound involute of a circle and an ellipse, the two engaging surfaces defining opposite sides of the tooth.

14. The gearbox system of claim 10, wherein the plurality of face teeth are disposed on a frustoconical surface of the wobble plate, the frustoconical surface configured such that a center of mass of the wobble plate is a vertex of the frustoconical surface.

15. A method for operating a gearbox mechanism, comprising:
rotating an input plate including a plurality of input teeth;
engaging the plurality of input teeth with a plurality of face teeth of a wobble plate, thereby causing the wobble plate to nutate about a fulcrum;
engaging a first plurality of wobble teeth of the wobble plate with a plurality of stator teeth of a stator gear as the wobble plate nutates; and
engaging a second plurality of wobble teeth of the wobble plate with a plurality of output teeth of an output plate as the wobble plate nutates.

16. The method of claim 15, wherein each tooth of the first plurality of wobble teeth, the second plurality of wobble teeth, the plurality of stator teeth, and the plurality of output teeth has a face defined by a compound involute of a circle and an ellipse.

17. The method of claim 15, wherein the stator gear defines a stator plane, the input plate is configured to be parallel to the stator plane, the output plate is configured to be parallel to the stator plane, and the wobble plate is configured to be inclined at an angle with respect to the stator plane and disposed between the input plate and the output plate.

18. The method of claim 15, wherein each stator tooth of the plurality of stator teeth has a stator tooth apex, and the apexes of the plurality of stator teeth define a stator plane, and during a single nutation of the wobble plate, at least a portion of one of the plurality of wobble teeth is configured to move from a first position below the stator plane, through the stator plane to a second position above the stator plane, and back through the stator plane to a third position below the stator plane.

19. The method of claim 15, wherein rotating the input plate includes coupling the input plate to an input shaft and rotating the input shaft.

20. The method of claim 15, wherein engaging the second plurality of wobble teeth of the wobble plate with the plurality of output teeth of the output plate causes the output plate to rotate and wherein a rotational rate of the input plate is different than a rotational rate of the output plate.

* * * * *